US008254443B2

(12) United States Patent
Dencher

(10) Patent No.: US 8,254,443 B2
(45) Date of Patent: Aug. 28, 2012

(54) LATENCY RATE DISTORTION OPTIMISATION

(75) Inventor: Anthony Peter Dencher, Southampton (GB)

(73) Assignee: Ericsson Television, Inc., Duluth, GA (US)

( * ) Notice: Subject to any disclaimer, the term of this patent is extended or adjusted under 35 U.S.C. 154(b) by 517 days.

(21) Appl. No.: 12/550,127

(22) Filed: Aug. 28, 2009

(65) Prior Publication Data

US 2011/0051803 A1    Mar. 3, 2011

(51) Int. Cl.
  *H04N 7/12*    (2006.01)
(52) U.S. Cl. ............... 375/240.03; 375/240.22
(58) Field of Classification Search .................. None
  See application file for complete search history.

(56) References Cited

U.S. PATENT DOCUMENTS

| 7,936,818 B2* | 5/2011 | Jayant et al. ............ 375/240.05 |
| 2004/0258155 A1* | 12/2004 | Lainema et al. ......... 375/240.16 |
| 2005/0025374 A1* | 2/2005 | Ishikawa ................. 382/252 |
| 2007/0223582 A1* | 9/2007 | Borer ..................... 375/240.12 |
| 2009/0147843 A1* | 6/2009 | Han et al. ............... 375/240.03 |
| 2009/0257492 A1* | 10/2009 | Andersson et al. ...... 375/240.12 |

* cited by examiner

*Primary Examiner* — Phirin Sam

(57) ABSTRACT

There is provided an improved latency rate distortion optimization apparatus comprising a forward quantize unit (1200) for processing input coefficients ($W_{ij}$), an inverse quantize unit (1300) coupled to the forward quantize unit (1200), and at least one look-up-table (150) of quantize values for use by the forward (1200) and inverse (1300) quantize units, wherein the at least one look-up-table (150) of quantize values further includes any one or more of the following modified quantize multiplication factors: negative forward quantize multiplication factors (−MF); pre-shifted forward quantize multiplication factors ($MF_{ps}$); negative pre-shifted forward quantize multiplication factors (−$MF_{ps}$); negative inverse quantize multiplication factors (−V); pre-shifted inverse quantize multiplication factors ($V_{ps}$); or negative pre-shifted inverse quantize multiplication factors (−$V_{ps}$), and the forward quantize unit (1200) is arranged to operate on the input coefficients ($W_{ij}$) using one of the modified forward quantize multiplication factors, and the inverse quantize unit (1300) is arranged to operate on the output of the forward quantize unit (1200) using one of the modified inverse quantize multiplication factors.

12 Claims, 18 Drawing Sheets

| Clock Cycle | Prediction Mode 0 | Prediction Mode 1 | | Prediction Mode 7 | Prediction Mode 8 |
|---|---|---|---|---|---|
| 0 | Start 4x4Blk 0 | | | | |
| 1 | Prediction | | | | |
| 2 | Residual | Prediction | | | |
| 3 | Transform1 | Residual | | | |
| 4 | Transform2 | Transform1 | | | |
| 5 | Transform3 | Transform2 | ... | | |
| 6 | Transform4 | Transform3 | ... | | |
| 7 | Quantise1 | Transform4 | ... | | |
| 8 | Quantise2 | Quantise1 | ... | Prediction | |
| 9 | Quantise3 | Quantise2 | ... | Residual | Prediction |
| 10 | Quantise4 | Quantise3 | ... | Transform1 | Residual |
| 11 | Quantise5 | Quantise4 | ... | Transform2 | Transform1 |
| 12 | Quantise6 | Quantise5 | ... | Transform3 | Transform2 |
| 13 | InvQuant1 | Quantise6 | ... | Transform4 | Transform3 |
| 14 | InvQuant2 | InvQuant1 | ... | Quantise1 | Transform4 |
| 15 | InvQuant3 | InvQuant2 | ... | Quantise2 | Quantise1 |
| 16 | InvTrans1 | InvQuant3 | ... | Quantise3 | Quantise2 |
| 17 | InvTrans2 | InvTrans1 | ... | Quantise4 | Quantise3 |
| 18 | InvTrans3 | InvTrans2 | ... | Quantise5 | Quantise4 |
| 19 | InvTrans4 | InvTrans3 | ... | Quantise6 | Quantise5 |
| 20 | Recon | InvTrans4 | ... | InvQuant1 | Quantise6 |
| 21 | Distortion1 | Recon | ... | InvQuant2 | InvQuant1 |
| 22 | Distortion2 | Distortion1 | ... | InvQuant3 | InvQuant2 |
| 23 | Distortion3 | Distortion2 | ... | InvTrans1 | InvQuant3 |
| 24 | Distortion4 | Distortion3 | ... | InvTrans2 | InvTrans1 |
| 25 | Distortion5 | Distortion4 | ... | InvTrans3 | InvTrans2 |
| 26 | Luma RDO | Distortion5 | ... | InvTrans4 | InvTrans3 |
| 27 | | Luma RDO | ... | Recon | InvTrans4 |
| 28 | | | ... | Distortion1 | Recon |
| 29 | | | ... | Distortion2 | Distortion1 |
| 30 | | | | Distortion3 | Distortion2 |
| 31 | | | | Distortion4 | Distortion3 |
| 32 | | | | Distortion5 | Distortion4 |
| 33 | | | | Luma RDO | Distortion5 |
| 34 | | | | | Luma RDO |
| 35 | Start 4x4Blk 1 | | | | End 4x4blk 0 |

FIG.3

| Clock Cycle | Pred Mode0 4x4Blk 0 | Pred Mode0 4x4Blk 1 | Pred Mode0 4x4Blk 2 | Pred Mode0 4x4Blk 3 | Pred Mode1 4x4Blk 0 | | Pred Mode8 4x4Blk 2 | Pred Mode8 4x4Blk 3 |
|---|---|---|---|---|---|---|---|---|
| 0 | Start 8x8 0 | | | | | | | |
| 1 | Pred1 | | | | | | | |
| 2 | Pred2 | Pred1 | | | | | | |
| 3 | Residual | Pred2 | Pred1 | | | | | |
| 4 | Trans1 | Residual | Pred2 | Pred1 | | | | |
| 5 | Trans2 | Trans1 | Residual | Pred2 | Pred1 | | | |
| 6 | Trans3 | Trans2 | Trans1 | Residual | Pred2 | | | |
| 7 | Trans4 | Trans3 | Trans2 | Trans1 | Residual | | | |
| 8 | Trans5 | Trans4 | Trans3 | Trans2 | Trans1 | | | |
| 9 | Trans6 | Trans5 | Trans4 | Trans3 | Trans2 | | | |
| 10 | Trans7 | Trans6 | Trans5 | Trans4 | Trans3 | | | |
| 11 | Trans8 | Trans7 | Trans6 | Trans5 | Trans4 | | | |
| 12 | Trans9 | Trans8 | Trans7 | Trans6 | Trans5 | | | |
| 13 | Quant1 | Trans9 | Trans8 | Trans7 | Trans6 | | | |
| 14 | Quant2 | Quant1 | Trans9 | Trans8 | Trans7 | | | |
| 15 | Quant3 | Quant2 | Quant1 | Trans9 | Trans8 | | | |
| 16 | Quant4 | Quant3 | Quant2 | Quant1 | Trans9 | | | |
| 17 | Quant5 | Quant4 | Quant3 | Quant2 | Quant1 | | | |
| 18 | Quant6 | Quant5 | Quant4 | Quant3 | Quant2 | | | |
| 19 | InvQuant1 | Quant6 | Quant5 | Quant4 | Quant3 | | | |
| 20 | InvQuant2 | InvQuant1 | Quant6 | Quant5 | Quant4 | | | |
| 21 | InvQuant3 | InvQuant2 | InvQuant1 | Quant6 | Quant5 | | | |
| 22 | InvTrans1 | InvQuant3 | InvQuant2 | InvQuant1 | Quant6 | ... | | |
| 23 | InvTrans2 | InvTrans1 | InvQuant3 | InvQuant2 | InvQuant1 | ... | | |
| 24 | InvTrans3 | InvTrans2 | InvTrans1 | InvQuant3 | InvQuant2 | ... | | |
| 25 | InvTrans4 | InvTrans3 | InvTrans2 | InvTrans1 | InvQuant3 | ... | | |
| 26 | InvTrans5 | InvTrans4 | InvTrans3 | InvTrans2 | InvTrans1 | ... | | |
| 27 | InvTrans6 | InvTrans5 | InvTrans4 | InvTrans3 | InvTrans2 | ... | | |
| 28 | InvTrans7 | InvTrans6 | InvTrans5 | InvTrans4 | InvTrans3 | ... | | |
| 29 | InvTrans8 | InvTrans7 | InvTrans6 | InvTrans5 | InvTrans4 | ... | | |
| 30 | InvTrans9 | InvTrans8 | InvTrans7 | InvTrans6 | InvTrans5 | ... | | |
| 31 | InvTrans10 | InvTrans9 | InvTrans8 | InvTrans7 | InvTrans6 | ... | | |
| 32 | InvTrans11 | InvTrans10 | InvTrans9 | InvTrans8 | InvTrans7 | ... | | |
| 33 | Recon | InvTrans11 | InvTrans10 | InvTrans9 | InvTrans8 | ... | | |
| 34 | Distort1 | Recon | InvTrans11 | InvTrans10 | InvTrans9 | ... | | |
| 35 | Distort2 | Distort1 | Recon | InvTrans11 | InvTrans10 | ... | Pred1 | |
| 36 | Distort3 | Distort2 | Distort1 | Recon | InvTrans11 | ... | Pred2 | Pred1 |
| 37 | Distort4 | Distort3 | Distort2 | Distort1 | Recon | ... | Residual | Pred2 |
| 38 | Distort5 | Distort4 | Distort3 | Distort2 | Distort1 | ... | Trans1 | Residual |
| 39 | Distort6 | Distort5 | Distort4 | Distort3 | Distort2 | ... | Trans2 | Trans1 |
| 40 | Distort7 | Distort6 | Distort5 | Distort4 | Distort3 | ... | Trans3 | Trans2 |
| 41 | Distort8 | Distort7 | Distort6 | Distort5 | Distort4 | ... | Trans4 | Trans3 |

FIG.10a

| 42 | Distort9 | Distort8 | Distort7 | Distort6 | Distort5 | ... | Trans5 | Trans4 |
|---|---|---|---|---|---|---|---|---|
| 43 | Distort10 | Distort9 | Distort8 | Distort7 | Distort6 | ... | Trans6 | Trans5 |
| 44 | Distort11 | Distort10 | Distort9 | Distort8 | Distort7 | ... | Trans7 | Trans6 |
| 45 | Distort12 | Distort11 | Distort10 | Distort9 | Distort8 | ... | Trans8 | Trans7 |
| 46 | LumaRDO | Distort12 | Distort11 | Distort10 | Distort9 | ... | Trans9 | Trans8 |
| 47 | | LumaRDO | Distort12 | Distort11 | Distort10 | ... | Quant1 | Trans9 |
| 48 | | | LumaRDO | Distort12 | Distort11 | ... | Quant2 | Quant1 |
| 49 | | | | LumaRDO | Distort12 | ... | Quant3 | Quant2 |
| 50 | | | | | LumaRDO | ... | Quant4 | Quant3 |
| 51 | | | | | | ... | Quant5 | Quant4 |
| 52 | | | | | | ... | Quant6 | Quant5 |
| 53 | | | | | | ... | InvQuant1 | Quant6 |
| 54 | | | | | | ... | InvQuant2 | InvQuant1 |
| 55 | | | | | | ... | InvQuant3 | InvQuant2 |
| 56 | | | | | | ... | InvTrans1 | InvQuant3 |
| 57 | | | | | | ... | InvTrans2 | InvTrans1 |
| 58 | | | | | | ... | InvTrans3 | InvTrans2 |
| 59 | | | | | | ... | InvTrans4 | InvTrans3 |
| 60 | | | | | | ... | InvTrans5 | InvTrans4 |
| 61 | | | | | | ... | InvTrans6 | InvTrans5 |
| 62 | | | | | | ... | InvTrans7 | InvTrans6 |
| 63 | | | | | | ... | InvTrans8 | InvTrans7 |
| 64 | | | | | | ... | InvTrans9 | InvTrans8 |
| 65 | | | | | | ... | InvTrans10 | InvTrans9 |
| 66 | | | | | | ... | InvTrans11 | InvTrans10 |
| 67 | | | | | | ... | Recon | InvTrans11 |
| 68 | | | | | | ... | Distort1 | Recon |
| 69 | | | | | | ... | Distort2 | Distort1 |
| 70 | | | | | | ... | Distort3 | Distort2 |
| 71 | | | | | | ... | Distort4 | Distort3 |
| 72 | | | | | | ... | Distort5 | Distort4 |
| 73 | | | | | | | Distort6 | Distort5 |
| 74 | | | | | | | Distort7 | Distort6 |
| 75 | | | | | | | Distort8 | Distort7 |
| 76 | | | | | | | Distort9 | Distort8 |
| 77 | | | | | | | Distort10 | Distort9 |
| 78 | | | | | | | Distort11 | Distort10 |
| 79 | | | | | | | Distort12 | Distort11 |
| 80 | | | | | | | LumaRDO | Distort12 |
| 81 | | | | | | | | LumaRDO |
| 82 | Start 8x8 1 | | | | | | | End8x8 0 |

FIG.10b

| Clock Cycle | Prediction Mode 0 | Prediction Mode 1 | | Prediction Mode 7 | Prediction Mode 8 |
|---|---|---|---|---|---|
| 0 | Start 4x4Blk 0 | | | | |
| 1 | Prediction | | | | |
| 2 | Residual | Prediction | | | |
| 3 | Transform1 | Residual | | | |
| 4 | Transform2 | Transform1 | | | |
| 5 | Transform3 | Transform2 | ... | | |
| 6 | Transform4 | Transform3 | ... | | |
| 7 | Quantise1 | Transform4 | ... | | |
| 8 | Quantise2 | Quantise1 | ... | Prediction | |
| 9 | Quantise3 | Quantise2 | ... | Residual | Prediction |
| 10 | InvQuant1 | Quantise3 | ... | Transform1 | Residual |
| 11 | InvQuant2 | InvQuant1 | ... | Transform2 | Transform1 |
| 12 | InvTrans1 | InvQuant2 | ... | Transform3 | Transform2 |
| 13 | InvTrans2 | InvTrans1 | ... | Transform4 | Transform3 |
| 14 | InvTrans3 | InvTrans2 | ... | Quantise1 | Transform4 |
| 15 | InvTrans4 | InvTrans3 | ... | Quantise2 | Quantise1 |
| 16 | Recon | InvTrans4 | ... | Quantise3 | Quantise2 |
| 17 | Distortion1 | Recon | ... | InvQuant1 | Quantise3 |
| 18 | Distortion2 | Distortion1 | ... | InvQuant2 | InvQuant1 |
| 19 | Distortion3 | Distortion2 | ... | InvTrans1 | InvQuant2 |
| 20 | Distortion4 | Distortion3 | ... | InvTrans2 | InvTrans1 |
| 21 | Distortion5 | Distortion4 | ... | InvTrans3 | InvTrans2 |
| 22 | Luma RDO | Distortion5 | ... | InvTrans4 | InvTrans3 |
| 23 | | Luma RDO | ... | Recon | InvTrans4 |
| 24 | | | ... | Distortion1 | Recon |
| 25 | | | ... | Distortion2 | Distortion1 |
| 26 | | | | Distortion3 | Distortion2 |
| 27 | | | | Distortion4 | Distortion3 |
| 28 | | | | Distortion5 | Distortion4 |
| 29 | | | | Luma RDO | Distortion5 |
| 30 | | | | | Luma RDO |
| 31 | | | | | End 4x4blk 0 |
| 32 | Start 4x4Blk 1 | | | | |

FIG. 11

| Clock Cycle | Pred Mode0 4x4Blk 0 | Pred Mode0 4x4Blk 1 | Pred Mode0 4x4Blk 2 | Pred Mode0 4x4Blk 3 | Pred Mode1 4x4Blk 0 | | Pred Mode8 4x4Blk 2 | Pred Mode8 4x4Blk 3 |
|---|---|---|---|---|---|---|---|---|
| 0 | Start 8x8 0 | | | | | | | |
| 1 | Pred1 | | | | | | | |
| 2 | Pred2 | Pred1 | | | | | | |
| 3 | Residual | Pred2 | Pred1 | | | | | |
| 4 | Trans1 | Residual | Pred2 | Pred1 | | | | |
| 5 | Trans2 | Trans1 | Residual | Pred2 | Pred1 | | | |
| 6 | Trans3 | Trans2 | Trans1 | Residual | Pred2 | | | |
| 7 | Trans4 | Trans3 | Trans2 | Trans1 | Residual | | | |
| 8 | Trans5 | Trans4 | Trans3 | Trans2 | Trans1 | | | |
| 9 | Trans6 | Trans5 | Trans4 | Trans3 | Trans2 | | | |
| 10 | Trans7 | Trans6 | Trans5 | Trans4 | Trans3 | | | |
| 11 | Trans8 | Trans7 | Trans6 | Trans5 | Trans4 | | | |
| 12 | Trans9 | Trans8 | Trans7 | Trans6 | Trans5 | | | |
| 13 | Quant1 | Trans9 | Trans8 | Trans7 | Trans6 | | | |
| 14 | Quant2 | Quant1 | Trans9 | Trans8 | Trans7 | | | |
| 15 | Quant3 | Quant2 | Quant1 | Trans9 | Trans8 | | | |
| 16 | InvQuant1 | Quant3 | Quant2 | Quant1 | Trans9 | | | |
| 17 | InvQuant2 | InvQuant1 | Quant3 | Quant2 | Quant1 | | | |
| 18 | InvTrans1 | InvQuant2 | InvQuant1 | Quant3 | Quant2 | ... | | |
| 19 | InvTrans2 | InvTrans1 | InvQuant2 | InvQuant1 | Quant3 | ... | | |
| 20 | InvTrans3 | InvTrans2 | InvTrans1 | InvQuant2 | InvQuant1 | ... | | |
| 21 | InvTrans4 | InvTrans3 | InvTrans2 | InvTrans1 | InvQuant2 | ... | | |
| 22 | InvTrans5 | InvTrans4 | InvTrans3 | InvTrans2 | InvTrans1 | ... | | |
| 23 | InvTrans6 | InvTrans5 | InvTrans4 | InvTrans3 | InvTrans2 | ... | | |
| 24 | InvTrans7 | InvTrans6 | InvTrans5 | InvTrans4 | InvTrans3 | ... | | |
| 25 | InvTrans8 | InvTrans7 | InvTrans6 | InvTrans5 | InvTrans4 | ... | | |
| 26 | InvTrans9 | InvTrans8 | InvTrans7 | InvTrans6 | InvTrans5 | ... | | |
| 27 | InvTrans10 | InvTrans9 | InvTrans8 | InvTrans7 | InvTrans6 | ... | | |
| 28 | InvTrans11 | InvTrans10 | InvTrans9 | InvTrans8 | InvTrans7 | ... | | |
| 29 | Recon | InvTrans11 | InvTrans10 | InvTrans9 | InvTrans8 | ... | | |
| 30 | Distort1 | Recon | InvTrans11 | InvTrans10 | InvTrans9 | ... | | |
| 31 | Distort2 | Distort1 | Recon | InvTrans11 | InvTrans10 | ... | | |
| 32 | Distort3 | Distort2 | Distort1 | Recon | InvTrans11 | ... | | |
| 33 | Distort4 | Distort3 | Distort2 | Distort1 | Recon | ... | | |
| 34 | Distort5 | Distort4 | Distort3 | Distort2 | Distort1 | ... | | |
| 35 | Distort6 | Distort5 | Distort4 | Distort3 | Distort2 | ... | Pred1 | |
| 36 | Distort7 | Distort6 | Distort5 | Distort4 | Distort3 | ... | Pred2 | Pred1 |
| 37 | Distort8 | Distort7 | Distort6 | Distort5 | Distort4 | ... | Residual | Pred2 |
| 38 | Distort9 | Distort8 | Distort7 | Distort6 | Distort5 | ... | Trans1 | Residual |
| 39 | Distort10 | Distort9 | Distort8 | Distort7 | Distort6 | ... | Trans2 | Trans1 |
| 40 | Distort11 | Distort10 | Distort9 | Distort8 | Distort7 | ... | Trans3 | Trans2 |

FIG. 15a

| 41 | Distort12 | Distort11 | Distort10 | Distort9  | Distort8  | ... | Trans4    | Trans3    |
|----|-----------|-----------|-----------|-----------|-----------|-----|-----------|-----------|
| 42 | LumaRDO   | Distort12 | Distort11 | Distort10 | Distort9  | ... | Trans5    | Trans4    |
| 43 |           | LumaRDO   | Distort12 | Distort11 | Distort10 | ... | Trans6    | Trans5    |
| 44 |           |           | LumaRDO   | Distort12 | Distort11 | ... | Trans7    | Trans6    |
| 45 |           |           |           | LumaRDO   | Distort12 | ... | Trans8    | Trans7    |
| 46 |           |           |           |           | LumaRDO   | ... | Trans9    | Trans8    |
| 47 |           |           |           |           |           | ... | Quant1    | Trans9    |
| 48 |           |           |           |           |           | ... | Quant2    | Quant1    |
| 49 |           |           |           |           |           | ... | Quant3    | Quant2    |
| 50 |           |           |           |           |           | ... | InvQuant1 | Quant3    |
| 51 |           |           |           |           |           | ... | InvQuant2 | InvQuant1 |
| 52 |           |           |           |           |           | ... | InvTrans1 | InvQuant2 |
| 53 |           |           |           |           |           | ... | InvTrans2 | InvTrans1 |
| 54 |           |           |           |           |           | ... | InvTrans3 | InvTrans2 |
| 55 |           |           |           |           |           | ... | InvTrans4 | InvTrans3 |
| 56 |           |           |           |           |           | ... | InvTrans5 | InvTrans4 |
| 57 |           |           |           |           |           | ... | InvTrans6 | InvTrans5 |
| 58 |           |           |           |           |           | ... | InvTrans7 | InvTrans6 |
| 59 |           |           |           |           |           | ... | InvTrans8 | InvTrans7 |
| 60 |           |           |           |           |           | ... | InvTrans9 | InvTrans8 |
| 61 |           |           |           |           |           | ... | InvTrans10| InvTrans9 |
| 62 |           |           |           |           |           | ... | InvTrans11| InvTrans10|
| 63 |           |           |           |           |           | ... | Recon     | InvTrans11|
| 64 |           |           |           |           |           | ... | Distort1  | Recon     |
| 65 |           |           |           |           |           |     | Distort2  | Distort1  |
| 66 |           |           |           |           |           |     | Distort3  | Distort2  |
| 67 |           |           |           |           |           |     | Distort4  | Distort3  |
| 68 |           |           |           |           |           |     | Distort5  | Distort4  |
| 69 |           |           |           |           |           |     | Distort6  | Distort5  |
| 70 |           |           |           |           |           |     | Distort7  | Distort6  |
| 71 |           |           |           |           |           |     | Distort8  | Distort7  |
| 72 |           |           |           |           |           |     | Distort9  | Distort8  |
| 73 |           |           |           |           |           |     | Distort10 | Distort9  |
| 74 |           |           |           |           |           |     | Distort11 | Distort10 |
| 75 |           |           |           |           |           |     | Distort12 | Distort11 |
| 76 |           |           |           |           |           |     | LumaRDO   | Distort12 |
| 77 |           |           |           |           |           |     |           | LumaRDO   |
| 78 | Start 8x8 1 |         |           |           |           |     |           | End 8x8 0 |

FIG. 15b

LATENCY RATE DISTORTION OPTIMISATION

TECHNICAL FIELD

The invention is related to video coding in general, and in particular to an improved latency apparatus for Rate Distortion Optimisation and a method of improving latency in a Rate Distortion Optimisation apparatus.

BACKGROUND

Video compression methods are used within digital television broadcasting systems to reduce the data rate per channel while maintaining picture quality. It is a primary objective of these compression methods that the instantaneous demand of the moving television picture sequence for transmission capacity is substantially met at all times despite its varying complexity.

Typical transmission channels used to convey audio-visual material have fixed bit rates and so the varying demand of the picture sequence for capacity may not always be satisfied. It is an inevitable result of the compression process that for extremes of highly complex picture behavior, the picture quality may occasionally be compromised in order that the bit rate criteria are met. By choosing a bit rate that is too low, poor quality will result for a significant proportion of the time. Conversely, a chosen bit rate that is too high will meet quality needs, but will waste transmission capacity for a significant proportion of the time. Thus, some kind of control mechanism is required that evens out the peaks and troughs of demand so that a given fixed bit rate is adequate to deliver good picture quality at all times. Part of such control ideally should take some objective measure of the picture quality into account so that the distortion in the picture is known to some degree. The optimisation of this process is called Rate Distortion Optimisation (RDO) and is an inherent part of practical realizations of modern compression methods.

The complex compression methods currently employed have become very sophisticated and use a variety of techniques in concert to achieve the objective of coding complex picture sequences using minimum bit rate. Typically, in such methods the compressed picture sequence of the television signal is hierarchically structured at a number of levels, each enabling the full set of coding tools available to be applied efficiently.

At the highest of these levels, the picture sequence is organized into contiguous Groups of Pictures (GOP) and each group is further organized so that the first picture of each GOP is coded without reference to any other picture in the sequence. This is known as Intra-picture coding, and the resultant picture is called an I picture. Subsequent pictures in the GOP are coded differentially with respect to other pictures in the GOP including this I picture.

For example the second picture in the GOP is typically predicted directly from the first I picture and the differences between the prediction and the actual picture, typically being small, are then coded with the consequence that the bit rate requirement is reduced. The resultant picture is known as a Predicted or P picture.

The next picture of the GOP may also be predicted in turn from this P picture and this pattern may repeat for the remainder of the GOP. These P predictions are uni-directional and use past pictures to predict future ones in a sequence of mutual dependence. It is also possible to code pictures in the GOP using Bi-directional prediction (i.e. using both past and future pictures) which effectively predictively interpolates the current picture. These pictures are known as B pictures.

Thus a typical GOP may have a structure such as IPPBPPB or IBBPBBP, etc, and this structure and the GOP length are arbitrary and set by the system operator to suite the needs of a given application.

In typical video systems, a two dimensional image of a scene is usually scanned in a raster fashion from top left to bottom right in a series of so-called horizontal lines, and then each scan is repeated regularly to produce a sequence. The resolution or sharpness of the picture is determined by the number of picture elements or pixels allocated to the scan. The shape of the picture, its aspect ratio, determines the relationship between the number of horizontal and vertical pixels. In broadcast systems these numbers are standardized.

It is typical of television pictures that their representation takes one of two forms. Either the individual picture scans are completed using only one pass of the image or they can be done in two parts where half the scan is done in a first pass, where only the odd numbered horizontal lines are taken, and the second half is done a second pass where the remaining even numbered lines are taken. The former scan type is called Progressive or Sequential scan, and the latter is called an Interlaced scan.

The first pass of the interlaced scan produces the so-called Top Field and the second pass the Bottom Field. The two fields together cover the same number of pixels as the complete Progressive scan, and the complete picture is called a Frame.

It is clear that any movement in the picture during the Interlace scan will result in a degree of dislocation between the pixels of each Field and that degree of dislocation will be more severe the greater the speed of motion. This dislocation can cause a significant loss of efficiency in the compression of moving pictures and so it is better to code rapidly moving picture sequences Field by Field. All currently used compression methods recognize this and allow both Field and Frame modes to be chosen as the picture behavior demands.

The ITU-T H.264 (MPEG 4 part 10) compression standard used widely in the most recent commercial video compression products includes among its features the use of GOPs and a Field/Frame mode. In particular the coding of both P and B pictures in the GOP uses Inter-Field or Frame predictive methods. In order to extract the best performance from the standard, it divides each complete picture, either a Frame or a Field, into a large number of contiguous, rectilinear blocks of pixels. The most significant of these blocks is a square group of pixels called a macroblock (MB), which is typically 16×16 luminance pixels.

The predictive coding process operates primarily at MB level and the coding of a given MB in a given picture is performed using a prediction from a block or blocks within another picture or pictures in the GOP used as references and which have already been coded. However, the H.264 Inter prediction standard allows not only whole MBs to be predicted from a number of reference pictures, but it also allows various sub-divisions or Partitions of MBs to be predicted. This added sophistication, compared to older compression standards (such as MPEG-2) contributes to the superior performance of H.264. In the particular case of encoding a B Field/Frame, the reference pictures may be from previous pictures in display order—so called reference list0 pictures—or from later pictures in display order—so called reference list1 pictures.

The Predictive process described above, operating at MB or Partition level, seeks to find blocks of pixels in selected reference pictures that match a given block in the picture currently being coded. Motion search methods are commonly used to identify a number of best match blocks, or candidates, from a set of reference pictures. These candidates can be combined in list0/list1 pairs to produce Bi-predicted candidates.

Furthermore 16×16 pixel MBs and 8×8 pixel Partitions may also be predicted using the so called Direct Mode. Hence there may be several Inter prediction candidates for each MB and each Partition which must be compared to find the best, most efficient coding. This flexibility in the number of choices available improves the performance of the method, but at the expense of the additional processing required to evaluate each of the coding options.

Each assessment must be completed within the duration period of the MB, and the computing power and speed needed to do this are challenging and so an efficient practical method of achieving the required result is extremely valuable. For example, in a high definition encoder working on a 1920× 1080 pixel picture format at 60 Hz where a typical Frame period is 33.3 milliseconds there are 120×68=8160 MBs, each MB therefore having to be completely coded in 4 microseconds.

To achieve the most efficient and accurate video encoding, the comparison of the candidates ideally takes into account how high the quality of the output image will be, and also how many bits will be taken to encode the candidate. The Rate-Distortion Optimisation (RDO) technique solves this problem by taking into account both a video quality metric, measuring the Distortion as the deviation from the source material, and the bit cost for each possible decision outcome.

Currently known methods of RDO candidate assessment are inefficient in their use of available processing resources, necessitating higher powered processing resources than is strictly required. Higher powered processing resources are more expensive to implement, and require attendant increases in running costs, such as cooling requirements and power usage. Accordingly, the present invention seeks to provide an improved method and apparatus for assessing RDO candidates.

SUMMARY

Accordingly, there is provided an apparatus an improved latency rate distortion optimisation apparatus comprising a forward quantize unit for processing input coefficients ($W_{ij}$), an inverse quantize unit coupled to the forward quantize unit, and at least one look-up-table of quantize values for use by the forward and inverse quantize units. The at least one look-up-table of quantize values includes any one or more of the following modified quantize multiplication factors: negative forward quantiser multiplication factors ($-MF$); pre-shifted forward quantiser multiplication factors ($MF_{ps}$); negative pre-shifted forward quantiser multiplication factors ($-MF_{ps}$); negative inverse quantiser multiplication factors ($-V$); pre-shifted inverse quantiser multiplication factors ($V_{ps}$); or negative pre-shifted inverse quantiser multiplication factors ($-V_{ps}$), and the forward quantiser unit is arranged to operate on the input coefficients ($W_{ij}$) using one of the modified forward quantiser multiplication factors, and the inverse quantiser unit is arranged to operate on the output of the forward quantiser unit using one of the modified inverse quantiser multiplication factors.

By using pre-shifted and pre-negated forward and inverse quantiser multiplication factors ($+/-MF_{ps}$ and $+/-V_{ps}$) that are retrieved from memory during the processing of macroblock coding mode candidates, the candidate process pipeline is reduced in latency. Accordingly, all the necessary candidates can be processed within the available macroblock processing time, even for 1080p60 Hz video.

Optionally, the negative forward quantiser multiplication factor ($-MF$) or negative pre-shifted forward quantiser multiplication factor ($-MF_{ps}$) is selected for use by the forward quantiser unit in replacement of the normal positive forward quantiser multiplication factors if a respective forward quantiser input coefficient is negative, and the negative inverse quantiser multiplication factor ($-V$) or the negative pre-shifted inverse quantiser multiplication factor ($-V_{ps}$) is selected for use by the inverse quantiser unit if the respective forward quantiser input coefficient is negative.

Optionally, the rate distortion optimisation apparatus further comprises a two-way multiplexer unit for each of the forward and inverse quantiser units, each multiplexer unit adapted to select positive or negative quantiser multiplication factors for the forward and inverse quantiser units respectively, dependent upon a most significant bit of an input quantiser coefficient of the forward quantiser unit.

Optionally, the pre-shifted quantiser multiplication factors are pre-shifted dependent upon a value derived from the Quantisation Parameter (QP) value of a macroblock under test.

Optionally, the pre-shifted forward quantiser multiplication factors are restricted to 18 bits, and the pre-shifts applied comprise:

when $0 \leq \text{floor}(QP/6) \leq 3$:

$$MF_{ps} = (MF<<3)>>\text{floor}(QP/6); \text{ and}$$

when $4 \leq \text{floor}(QP/6) \leq 8$:

$$MF_{ps} = ((MF<<3) + 2^{\text{floor}(QP/6)-1})>>\text{floor}(QP/6);$$

such that the forward quantiser unit has the function:

$$|Z_{ij}| = (|W_{ij}| \cdot MF_{ps}) + 2^{18-\text{inter}/3} >> 18;$$

where $>>$ is a right shift, $Z_{ij}$ is an output coefficient of the forward quantiser unit, $W_{ij}$ is an input coefficient of the forward quantiser unit, and inter is 1 if the macroblock under test is from an inter picture and 0 otherwise.

Optionally, the pre-shifted inverse quantiser multiplication factors have the following pre-shift applied: $V_{ps} = (V << \text{floor}(QP/6))$.

Optionally, the forward quantiser unit further comprises a multiplication unit, having a first input provided by an output of a forward quantiser two-way multiplexer unit and the input coefficient $W_{ij}$ of interest as a second input, and a sign function unit, where an output of the sign function unit selects the output of the forward quantiser two-way multiplexer unit to multiply with the input coefficient $W_{ij}$ of interest.

Optionally, the rate distortion optimisation apparatus further comprises an addition unit adapted to add a predetermined value to the output of the multiplication unit, and a conditional divider unit, wherein the conditional divider unit is operable on the predetermined value if an input picture is an inter picture, and otherwise passes through the predetermined value to the addition unit.

Optionally, the inverse quantiser unit further comprises a multiplication unit, having a first input provided by an output of an inverse quantiser two-way multiplexer unit and an absolute quantised output (|Z|) of the forward quantiser unit as a second input, where an output of the sign function unit selects the output of the inverse quantiser two-way multiplexer unit to multiply with the absolute quantised output (|Z|).

There is also provided a video encoder comprising the above described rate distortion optimisation apparatus.

There is also provided a method of improving latency in a Rate Distortion Optimisation apparatus having a forward quantiser unit and an inverse quantiser unit and at least one look up table, the method comprising one or more of the following steps: Negating a forward quantiser multiplication factor (MF) and storing the negative MF in the at least one look up table, for selection according to a sign value of an input coefficient of the forward quantiser unit. Pre-shifting a forward quantiser multiplication factor (MF) value to produce a pre-shifted forward quantiser multiplication factor ($MF_{ps}$) value and storing $MF_{ps}$ in the at least one look up table. Negating the pre-shifted forward quantiser multiplication factor ($MF_{ps}$) and storing $-MF_{ps}$ in the at least one look-up table. Negating an inverse quantiser multiplication factor (V) and storing the negative V in the at least one look up table, for selection according to a sign value of an input coefficient of the forward quantiser unit. Pre-shifting an inverse quantiser multiplication factor (V) value to produce a pre-shifted inverse quantiser multiplication factor ($V_{ps}$) value and storing $V_{ps}$ in the at least one look up table. Negating the pre-shifted inverse quantiser multiplication factor ($V_{ps}$) and storing $-V_{ps}$ in the at least one look-up table.

The term 'negating' is used to mean 'to produce a negative value (of an input value)'.

The method then further comprises loading any one or more of the negative and/or pre-shifted quantiser multiplication factors from the at least one look up table, operating on the input coefficients by a forward quantiser unit using a one of the forward multiplication factors, and operating on the output of the forward quantiser unit by an inverse quantiser unit using one of the inverse multiplication factors.

Optionally, the pre-shifted forward quantiser multiplication factors are restricted to 18 bits, and the pre-shifting step comprises:

when $0 \leq \text{floor}(QP/6) \leq 3$:

$MF_{ps}=(MF<<3)>>\text{floor}(QP/6)$; and when $4 \leq \text{floor}(QP/6) \leq 8$:

$MF_{ps}=((MF<<3)+2^{\text{floor}(QP/6)-1})>>\text{floor}(QP/6)$;

such that the forward quantiser unit has the function:

$|Z_{ij}|=(|W_{ij}|\cdot MF_{ps})+2^{18-inter/3}>>18$;

Where >> is a right shift, $Z_{ij}$ is an output coefficient of the forward quantiser unit, $W_{ij}$ is an input coefficient of the forward quantiser unit, and inter is 1 if the macroblock under test is from an inter picture and 0 otherwise.

Optionally, the step of pre-shifting the inverse quantiser multiplication factors ($V_{ps}$) comprises the shift: $V_{ps}=(V<<\text{floor}(QP/6))$.

Optionally, the latency is reduced by removing calculation steps from the real time calculation portion of the Rate Distortion Optimisation method through pre-calculating adapted forward and inverse quantiser multiplication factors.

There is also provided RDO apparatus or a video encoder adapted to carry out any of the described method.

There is also provided a computer-readable medium, carrying instructions, which, when executed, causes computer logic to carry out any of the described method. Optionally, the quantiser values for use with the forward quantiser are stored in a first look-up-table and quantiser values for use with the inverse quantiser are stored in a second look-up-table.

Optionally, the one or more look-up-table further comprises one or more of the following sets of quantiser values: floor(QP/6), forward quantiser multiplication factor (MF) values for positions (0,0), (2,0), (2,2) and (0,2), forward quantiser multiplication factor (MF) values for positions (1,1), (1,3), (3,1) and (3,3), forward quantiser multiplication factor (MF) values for all other positions, inverse quantiser multiplication factor (V) values for positions (0,0), (2,0), (2,2) and (0,2), inverse quantiser multiplication factor (V) values for positions (1,1), (1,3), (3,1) and (3,3), and inverse quantiser multiplication factor (V) values for all other positions.

There is also provided an RDO apparatus comprising a look-up table storing a plurality of pre-determined values, a forward quantiser unit, comprising a first multiplication sub-unit, adapted to multiply a first pre-determined input value from the look-up table with an input coefficient, a conditional divider unit, for conditionally dividing a second pre-determined value from the look-up table, dependent upon an input picture type, a two input addition unit having a first input coupled to the output of the multiplication sub-unit and a second input coupled to the conditional divider unit, a sign function unit, for providing a sign value of the input coefficient to output from the forward quantiser unit, and a two way multiplexer to select and provide the first pre-determined input value to the multiplication sub-unit based upon the output of the sign function unit. The RDO apparatus may also further comprise an inverse quantiser comprising a second multiplication unit having as a first input the absolute value output of the forward quantiser, and as a second input a third predetermined input value dependent selected by a two-way multiplexer unit based upon the output of the sign function unit.

There is also provided a method of processing an input coefficient in an RDO apparatus having a forward quantiser unit, an inverse quantiser unit, and a look-up table including a plurality of multiplication factors for use by the forward and inverse quantiser units, the method comprising generating any one or more of the following modified multiplication factors: negative forward quantiser multiplication factors (−MF); pre-shifted forward quantiser multiplication factors (−$MF_{ps}$); negative pre-shifted forward quantiser multiplication factors ($MF_{ps}$); negative inverse quantiser multiplication factors (−V); pre-shifted inverse quantiser multiplication factors ($V_{ps}$); negative pre-shifted inverse quantiser multiplication factors ($V_{ps}$); and further comprising operating on the input coefficients using one of the modified multiplication factors.

The step of operating on the input coefficients further comprises operating on the input coefficients using the forward quantiser unit, and operating on the output of the forward quantiser unit by an inverse quantiser unit, where the forward quantiser unit uses a one of the forward quantiser multiplication factors −MF, $MF_{ps}$ or −$MF_{ps}$) and the inverse quantiser unit uses a one of the inverse quantiser multiplication factors (−V, $V_{ps}$ or −$V_{ps}$).

A computer-readable medium, carrying instructions, which, when executed, causes computer logic to carry out any of the above method.

An Inter picture is a Predicted (P) or Bi-Predicted (B) picture, and an Intra picture is an I picture. A picture may be referred to as a slice.

Existing decoding hardware may be used with the described improved RDO apparatus and method. Hence embodiments of the present invention are particularly beneficial when used to upgrade coding performance of digital video encoders that encode under older compression standards. This is because such an upgrade improves encoding performance without affecting the ability of existing decoders to decode the video data stream produced. Hence, quality of the overall system is improved without having to wholly replace the existing video decoding hardware at the receiver end. When dealing with an installed user base, this is an important consideration.

BRIEF DESCRIPTION OF THE DRAWINGS

An apparatus and method for Rate Distortion Optimisation will now be described, by way of example only, and with reference to the accompanying drawings in which:

FIG. 3 shows a more detailed view of the processing cycles used by the pipeline of FIG. 2;

FIG. 10 shows a more detailed view of the processing cycles used by the pipeline of FIG. 9;

FIG. 11 shows a more detailed view of the processing cycles used by an RDO processing pipeline for 4×4 blocks adapted according to an embodiment of the present invention;

FIG. 15 shows a more detailed view of the processing cycles used by an RDO processing pipeline for 8×8 blocks adapted according to an embodiment of the present invention;

DETAILED DESCRIPTION

Figure 1:
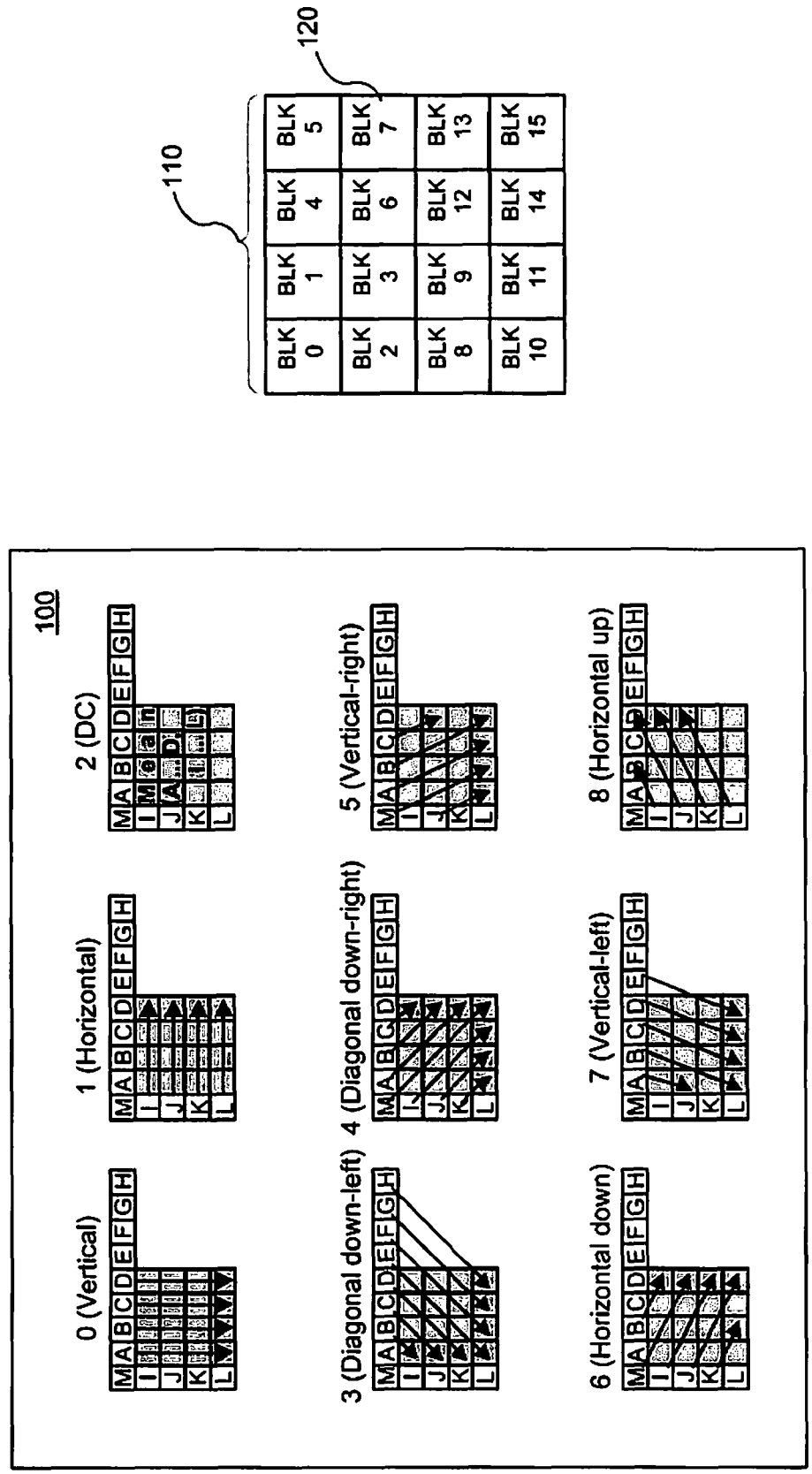
FIG. 1 shows the dependencies and block processing order for intra 4×4 modes in RDO.

An embodiment of the invention will now be described with reference to the accompanying drawings in which the same or similar parts or steps have been given the same or similar reference numerals.

The following description is cast in terms of an improvement to the H.264 video coding standard. However, it may equally be applied to any video encoding method having similar RDO decision constraints and quantisation method.

For a broadcast video encoder, a hardware design implemented using a Field Programmable Gate Array (FPGA) or Application Specific Integrated Circuit (ASIC) can be used to efficiently perform Rate Distortion Optimisation processing of all options (inter candidates and/or intra modes). A pipelined design can efficiently process the data within the macroblock period if the candidates or modes are processed contiguously such that the pipe is kept full.

Keeping the pipeline latency to a minimum improves the performance of the pipeline for processing any type of options (inter candidates, intra 16×16 modes, intra 8×8 modes, intra 4×4 modes), but it is particularly important for intra 4×4 modes and intra 8×8 modes.

The H.264 forward quantiser method is conventionally expressed as:

$$|Z_{ij}| = (|W_{ij}| \cdot MF + f) >> qbits$$

$$\mathrm{sign}(Z_{ij}) = \mathrm{sign}(W_{ij})$$

where $W_{ij}$ is the input coefficient, $Z_{ij}$ is the output coefficient, f is 2 qbits/3 for Intra blocks or 2 qbits/6 for Inter blocks, qbits=15+floor(QP/6) and MF is given in table below:

| QP mod 6 | Positions (0, 0), (2, 0), (2, 2), (0, 2) | Positions (1, 1), (1, 3), (3, 1), (3, 3) | All Other positions |
|---|---|---|---|
| 0 | 13107 | 5243 | 8066 |
| 1 | 11916 | 4660 | 7490 |
| 2 | 10082 | 4194 | 6554 |
| 3 | 9362 | 3647 | 5825 |
| 4 | 8192 | 3355 | 5243 |
| 5 | 7282 | 2893 | 4559 |

The H.264 inverse quantiser method is conventionally expressed as:

$$'W_{ij} = Z_{ij} \cdot V_{ij} \cdot 2^{floor(QP/6)}$$

where $Z_{ij}$ is the input coefficient, $'W_{ij}$ is the reconstituted output coefficient and $V_{ij}$ is given in the table below:

| QP mod 6 | Positions (0, 0), (2, 0), (2, 2), (0, 2) | Positions (1, 1), (1, 3), (3, 1), (3, 3) | All Other positions |
|---|---|---|---|
| 0 | 10 | 16 | 13 |
| 1 | 11 | 18 | 14 |
| 2 | 13 | 20 | 16 |
| 3 | 14 | 23 | 18 |
| 4 | 16 | 25 | 20 |
| 5 | 18 | 29 | 23 |

Figures 5, 6:
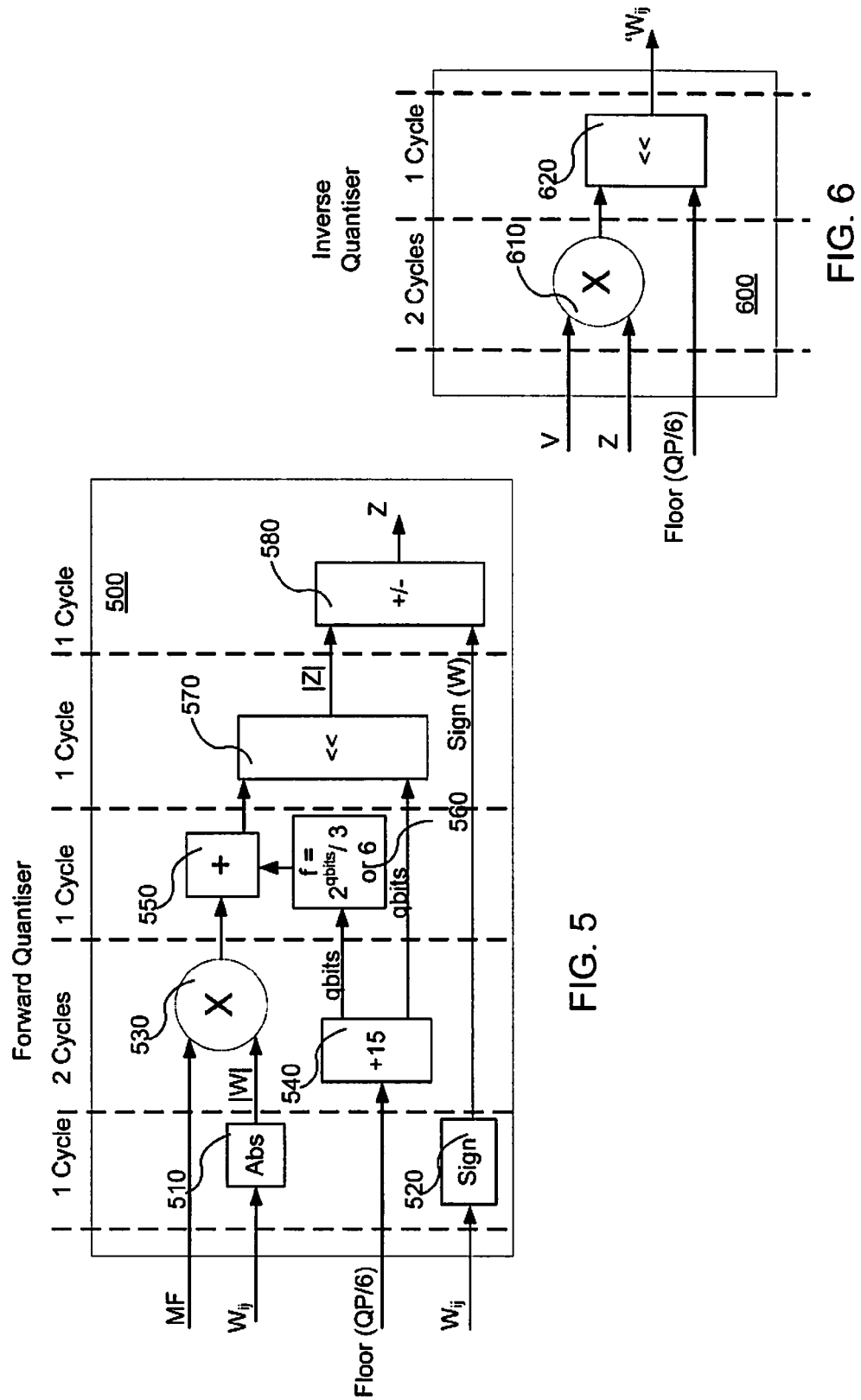
FIG. 5 shows a schematic diagram of a forward quantiser.
FIG. 6 shows a schematic diagram of an inverse quantiser.

Conventional implementations of the H.264 forward quantiser method and H.264 inverse quantiser method have pipeline latencies of 6 and 3 (as shown in FIGS. 5 and 6). These latencies significantly contribute to the total RDO engine pipeline latency as shown in FIG. 3.

FIG. 5 shows an implementation of the forward quantiser 500 where the input coefficient $W_n$ first enters a 1 cycle latency absolute value block 510 to give |W|. This is fed into one input of a 2 cycle latency multiplier 530. The other input to the multiplier 530 is the forward quantiser multiplication factor (MF) input. The multiplier 530 feeds a 1 cycle latency adder 550. The other input to the adder 550 is the value of T (see above), which is calculated by block 560. Block 560 has an input of 'qbits', which is calculated by a further adder 540 adding 15 to the input floor(QP/6). The value of 'qbits' is also fed to a variable shifter 570 which shifts the output of the adder 550 by 'qbits' to give |Z|. The value of |Z| is fed into a two's complement block 580 which negates the value of |Z| if sign(W) is negative to produce the output Z. The sign block 520 simply uses the most significant bit of the input $W_{ij}$ to give sign($W_{ij}$).

FIG. 6 shows the corresponding implementation of the inverse quantiser 600 where the inputs Z and V are fed to a multiplier 610. The output of the multiplier is fed to a variable shifter 620 which shifts by the output of the multiplier 610 by the value floor(QP/6). The output of the shifter 620 is the output $W_{ij}$, which is the reconstituted output coefficient of the inverse quantiser 600.

The intra 4×4 mode and intra 8×8 mode processing in a 1080p60 (i.e. high definition 1080 line progressive picture at 60 Hz) video encoder are used as examples to show how this latency is a problem.

Infra 4×4 Mode RDO Example

Processing all the intra 4×4 modes within a macroblock period is challenging due to the dependency of a particular 4×4 block's prediction on the previously encoded 4×4 blocks. This dependency can be seen in FIG. 1.

Processing of a particular 4×4 block can generally only start once the previous block has completed. This means that the 4×4 blocks cannot all be processed in parallel, and if processed in a pipeline the blocks cannot be contiguous, as shown in FIG. 1. The actual dependencies are determined by the nine encoding types (types 0-8, shown in box 100 of FIG. 1). The labelling order of 4×4 partitions 120 of a macroblock under test 110 are shown on the right hand side of FIG. 1.

The dependencies make the pipeline inefficient and increase the overall time required to process the intra 4×4 options. The overall time must be less than the macroblock processing period.

For a 1080i60 (i.e. high definition 1080 line interlaced picture at 60 Hz) video encoder the macroblock period is 4 µs, but for the 1080p60 encoder mentioned previously, the macroblock period is only 2 µs.

For a current generation FPGA, a clock speed of 200 Mhz is reasonable. This allows only 400 clock cycles per macroblock for a 1080p60 encoder, and 800 cycles for a 1080i60 encoder.

Unless both the reconstructed and original bitstream data for every option under assessment are processed and stored during their assessment (which uses substantial memory resources), then some cycles (approx. 82) out of the macroblock period are taken up with the top level RDO decision making between intra and inter options, and the eventual chosen macroblock run, where the reconstructed data and bitstream data for the chosen mode are re-generated and stored.

This leaves a maximum overall time of 318 cycles for each 1080p60 RDO engine pipeline, and 718 cycles for each 1080i60 RDO engine pipeline.

For a pipeline latency of 26 clock cycles, as shown in FIG. 3, the overall time for processing all intra 4×4 options in a single RDO engine pipeline is (26+9)*16=560 cycles. This is 35 cycles for each of the sixteen 4×4 blocks assessed.

While this is within the cycles available for processing a 1080i macroblock, it is greater than the 318 cycles available for processing a 1080p macroblock.

Figure 4:
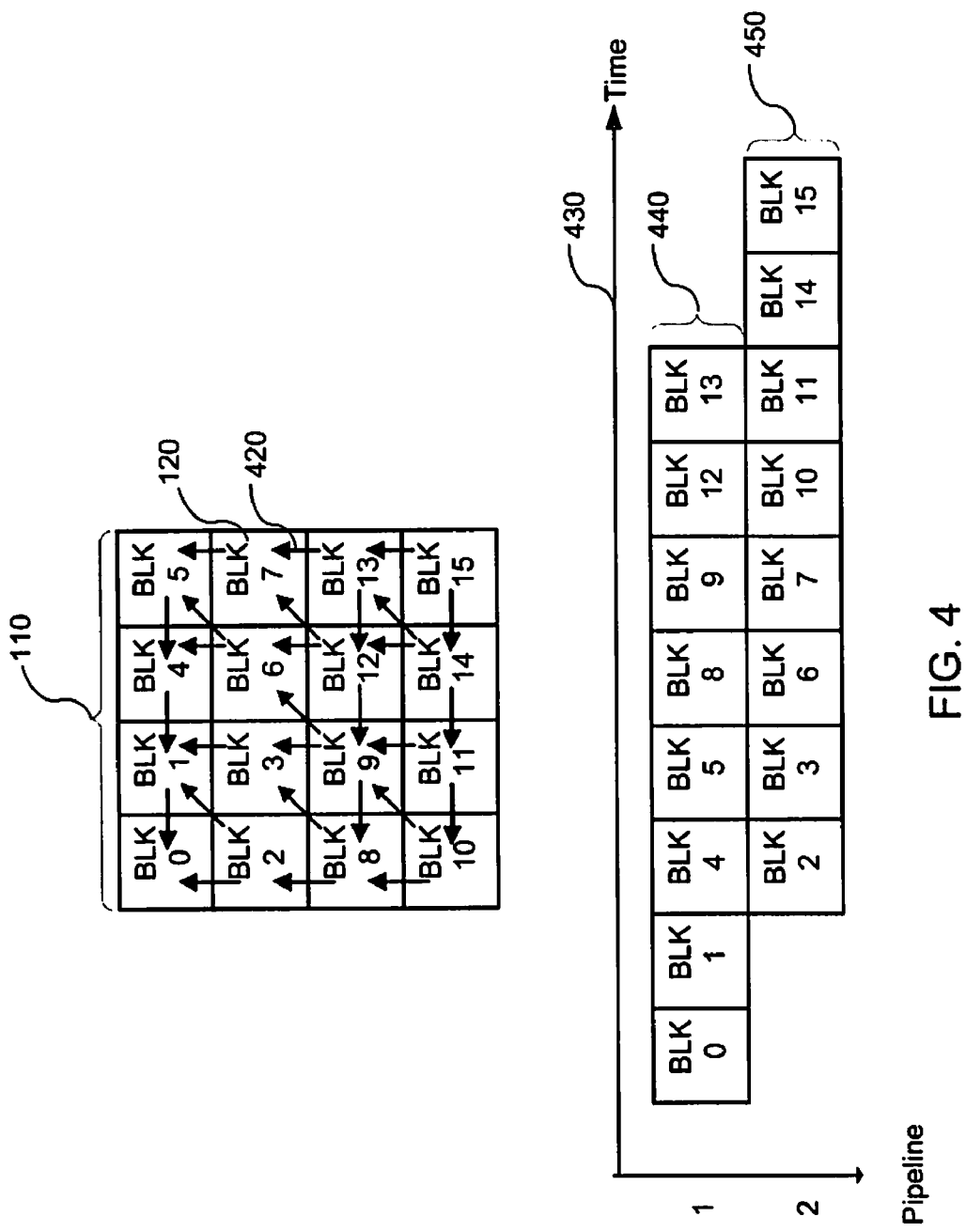
FIG. 4 shows how dual RDO processing pipelines can be used for 4×4 blocks.

Two intra 4×4 RDO engine pipelines may be run in parallel to decrease the overall time taken to process all coding modes. This is shown in more detail in FIG. 4, where each pipeline is shown on a chart of pipeline number (440, 450) vs time 430. The dependencies are shown as arrows 420 where the arrows point from a particular 4×4 block towards the 4×4 block it depends upon. Therefore, for the arrow 420, it shows that 4×4 block 13 depends on 4×4 block 7 being already encoded.

Figure 7:
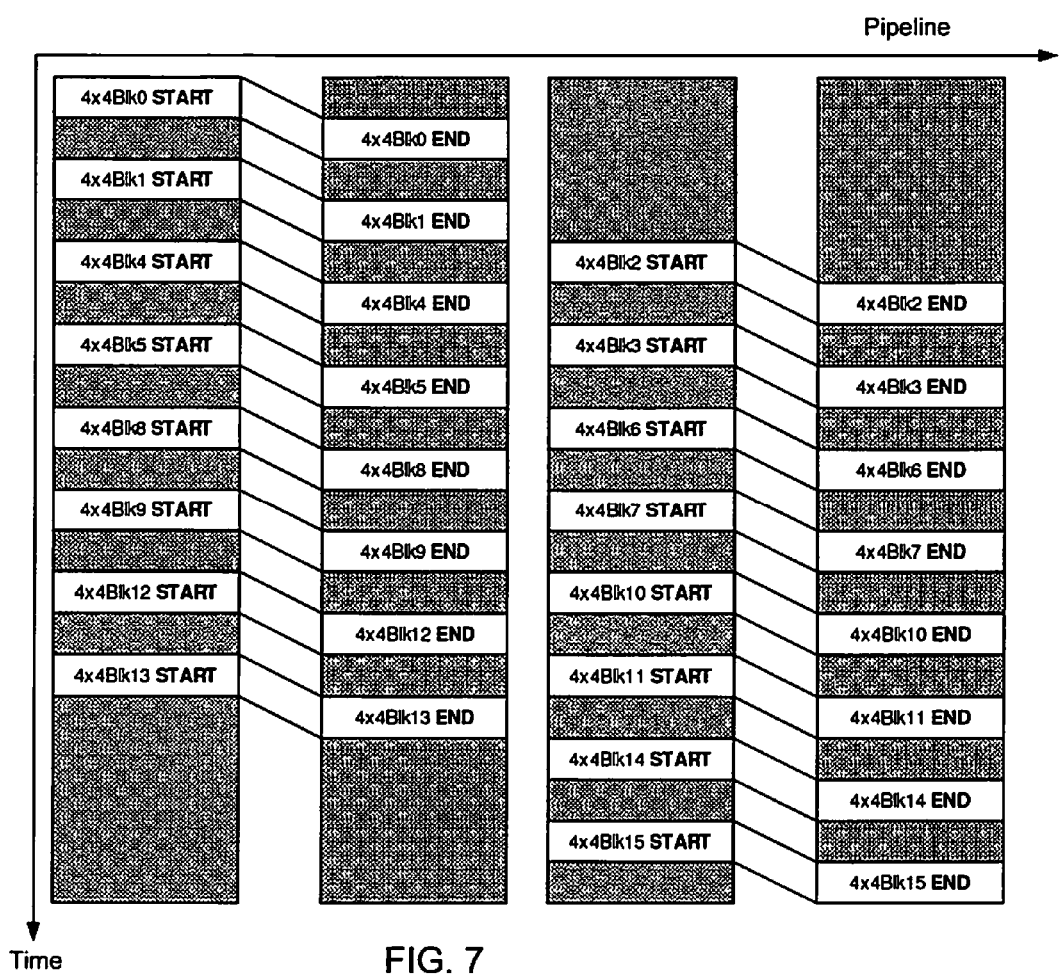
FIG. 7 shows a dual RDO processing pipeline for 4×4 blocks.

The first pipeline 440 processes the upper 4×4 blocks of each 8×8 block, while the second pipeline 450 processes the lower 4×4 blocks of each 8×8 block. If the second pipeline 450 starts two 4×4 blocks after the first pipeline 440, then all the prediction dependencies are satisfied (as shown in FIG. 7), but the overall time is only reduced to (26+9)*10=350 cycles. The sixteen 4×4 blocks are still being processed, but the overlap of 12 out of the 16 results in a total pipeline length of 10. This is still greater than the 318 cycles available.

One solution to this is to reduce the number of prediction modes processed to fit within the macroblock period. For example, only five modes may be used: (26+5)*10=310 cycles. However, using less modes is detrimental to encoder performance.

Intra 8×8 Mode RDO Example

Figure 8:
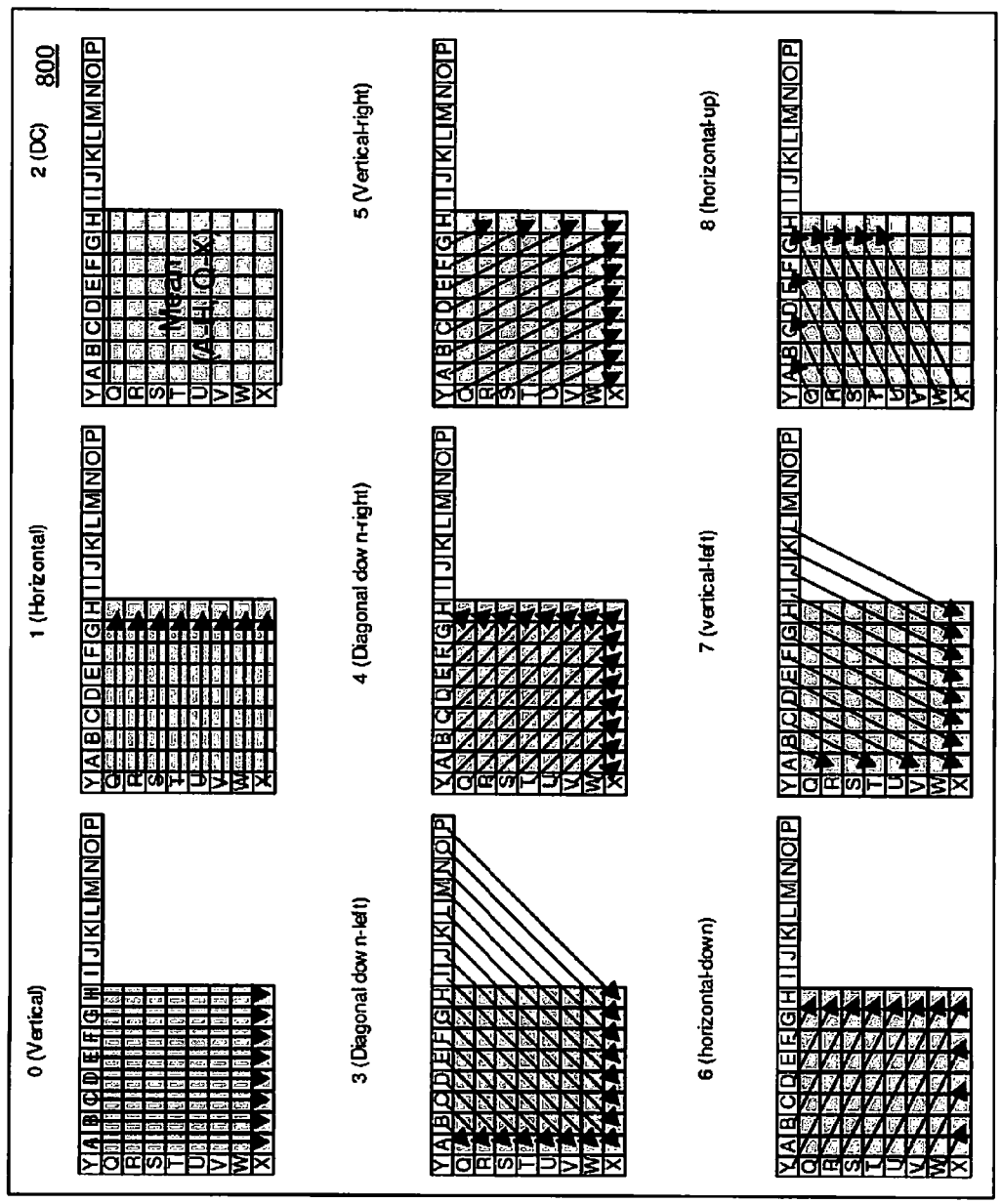
FIG. 8 shows the dependencies and block processing order for intra 8×8 modes in RDO.

Processing all the intra 8×8 modes within a macroblock period is also challenging due to the dependency of a particular 8×8 block's prediction on the previously encoded 8×8 blocks, see FIG. 8.

Figure 9:
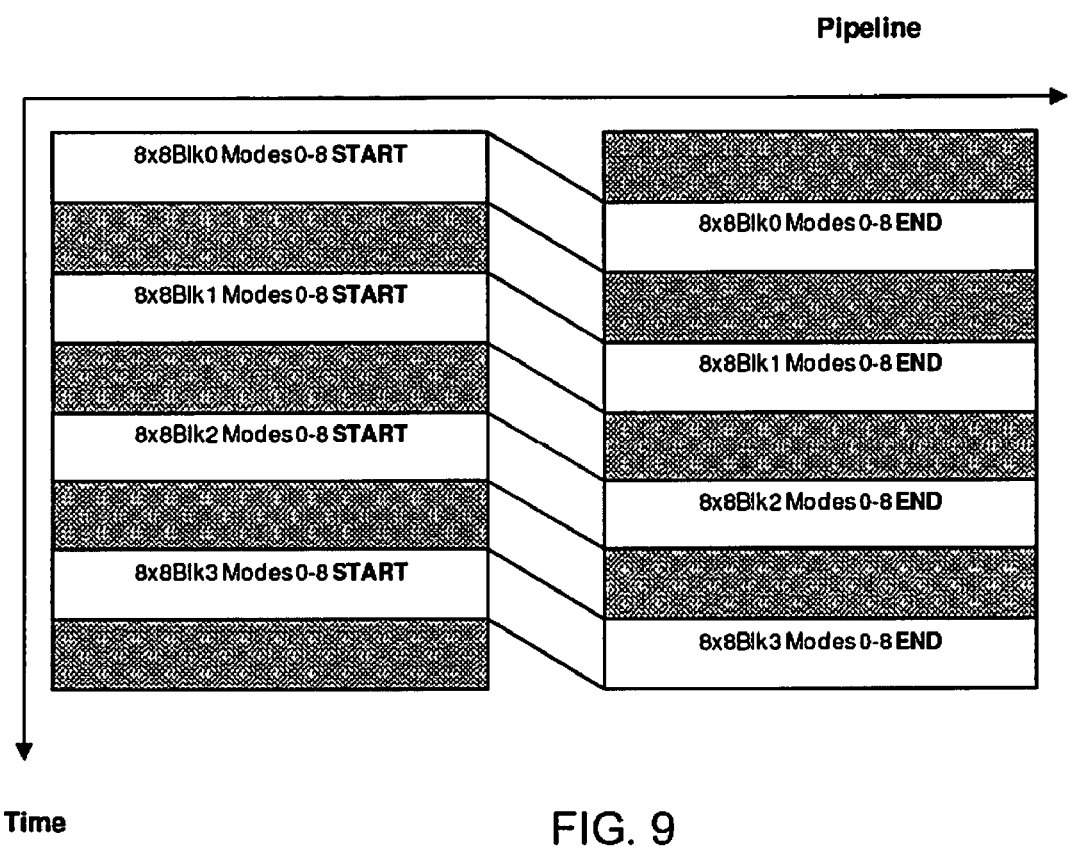
FIG. 9 shows a conventional single RDO processing pipeline for 8×8 blocks.

Processing of a particular 8×8 block can only start once the previous block has completed. This means that the 8×8 blocks cannot be processed contiguously either, as shown in FIG. 9, making the pipeline inefficient and increasing the overall time required to process the intra 8×8 options. The overall time must be less than the macroblock processing period.

As discussed above, the maximum overall time of 318 cycles is available for 1080p60 encoding of a macroblock.

For a pipeline latency of 46 clock cycles, as shown in FIGS. 10a/b, the overall time for processing all intra 8×8 options in a single RDO engine pipeline is (46+(9*4))*4=328 cycles, as each 8×8 block takes four cycles to process, and there are nine modes and four 8×8 blocks in a macroblock.

While this is within the cycles available for processing a 1080i macroblock, it is greater than the 318 cycles available for processing a 1080p macroblock.

One solution to this is to reduce the number of prediction modes processed, in order to fit all the processing within the macroblock period. For example, six mode assessments would result in (46+(6*4))*4=280 cycles used. However, this is again detrimental to encoder performance.

Accordingly, there is provided a forward quantiser/inverse quantiser (or scaling operation) implementation which reduces the latency of a pipelined RDO engine in an FPGA or ASIC. The proposed solution reduces the overall time required to process all the options for a macroblock of interest, and gives a more efficient hardware design than existing implementations. The proposed solution applies when processing any options (inter, intra 4×4, intra 8×8, intra 16×16, etc) within an RDO apparatus or engine, but is particularly useful for processing intra 4×4 and intra 8×8 modes within the available macroblock period, as the processing of the 4×4 modes and 8×8 modes has the tightest processing budget as described above.

The proposed solution reduces the latency of the forward quantiser and inverse quantiser blocks by 4 clock cycles overall. This is achieved in four steps:

1. The H.264 forward quantiser method requires multiplication of the absolute value of each input coefficient by a multiplication factor (MF). The proposed hardware solution achieves both the absolute value calculation and the multiplication in a single step (of 2 cycles) to save 1 clock cycle from the forward quantiser.
2. The penultimate step of the H.264 forward quantiser method requires that the output coefficient ($Z_{ij}$) is shifted by qbits. The proposed hardware solution achieves this shift by shifting the MF instead, which saves another 1 clock cycle from the forward quantiser.
3. The final step of the H.264 forward quantiser method requires that the sign of each output coefficient ($Z_{ij}$) is set to that of the input coefficient ($W_{ij}$). In the proposed hardware solution, the forward quantiser output coefficients are passed on to the inverse quantiser as a separate sign and absolute value, which saves another 1 clock cycle from the forward quantiser.

4. The final step of the H.264 inverse quantiser method requires that the output coefficient ($Z_{ij}$) is multiplied by 2 to the power of floor(QP/6) (which is equivalent to a shift by floor(QP/6), when carried out in the binary domain). The proposed hardware solution achieves this shift by shifting the multiplication factor (V) instead, which saves 1 clock cycle from the inverse quantiser.

Figure 2:
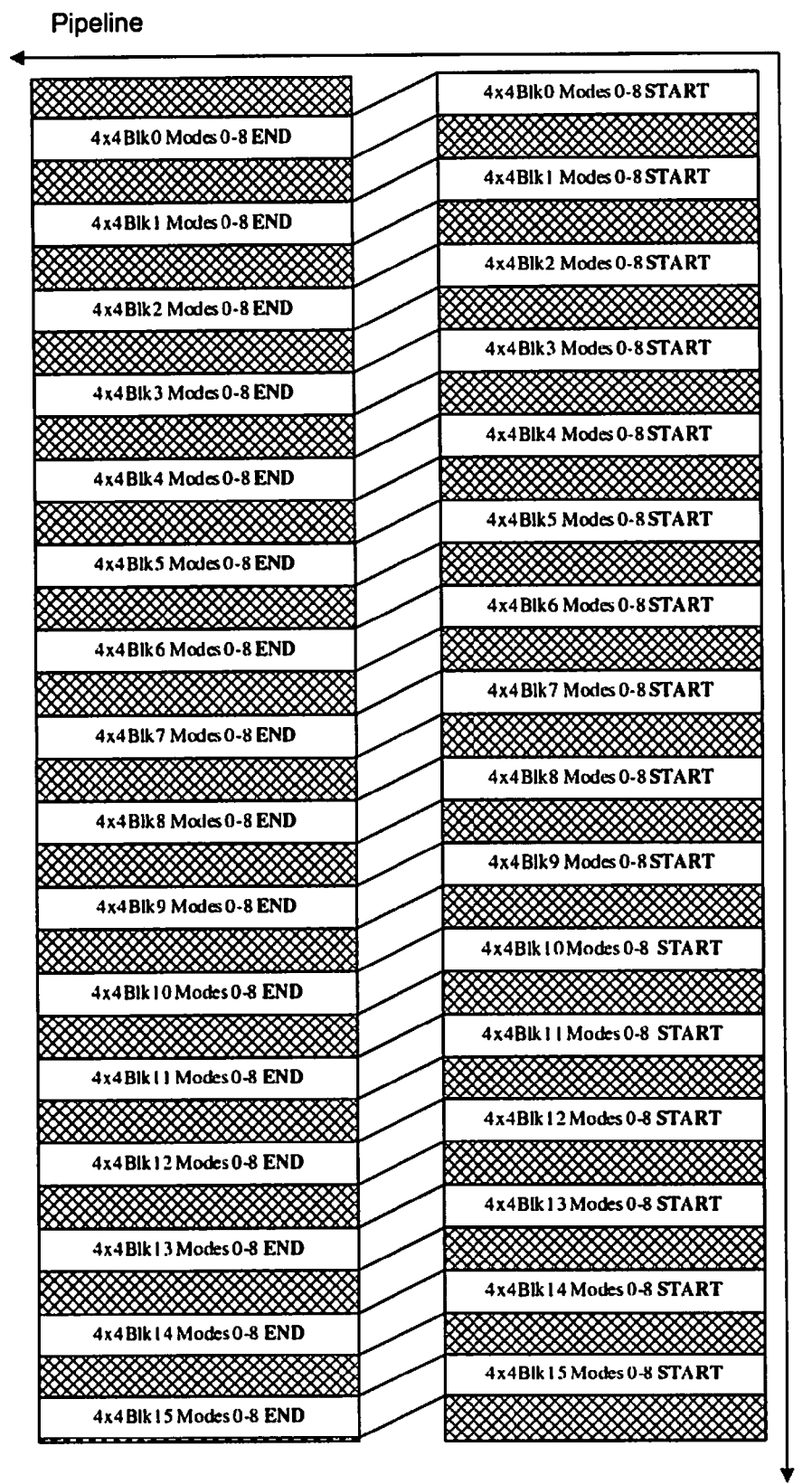
FIG. 2 shows a single RDO processing pipeline for 4×4 blocks.

The invention is particularly useful for processing intra 4×4 modes due to the dependency of each 4×4 block's prediction on the previously encoded 4×4 block. For this case, the gaps between each of the 4×4 blocks in the pipeline are equal to the latency of the pipeline as shown in FIG. 2. Hence, reducing the latency of the pipeline by even 1 clock cycle will reduce the overall cycles required and improve the efficiency of the pipeline significantly.

Figure 12:
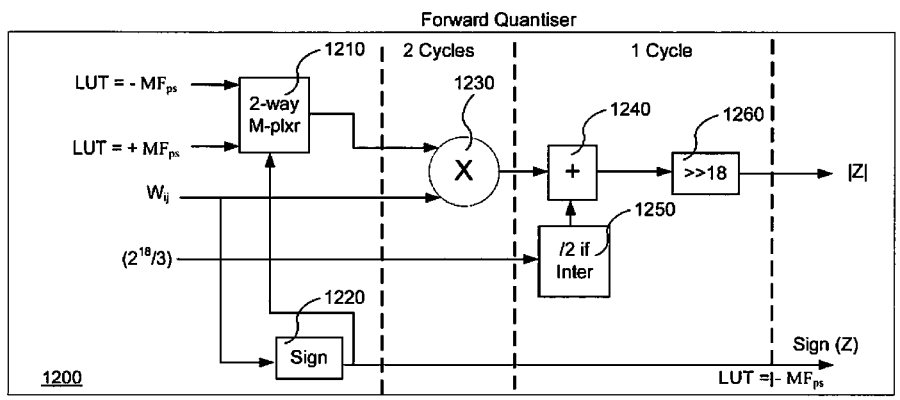
FIG. 12 shows a schematic diagram of an improved forward quantiser according to an embodiment of the present invention.
Figure 13:
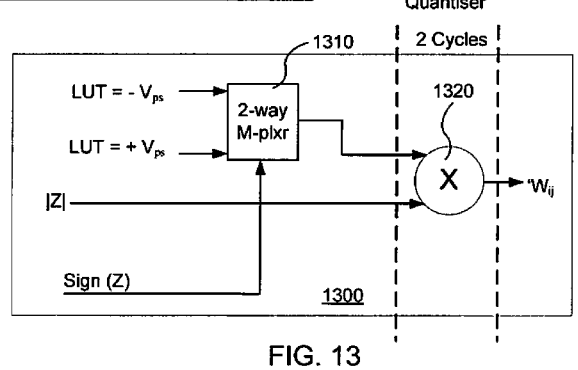
FIG. 13 shows a schematic diagram of an improved inverse quantiser according to an embodiment of the present invention.

The proposed hardware solution reduces the latency of the forward quantiser and inverse quantiser blocks by four clock cycles overall and saves resource in the entropy coder. The four steps for reducing pipeline latency are described in more detail below. FIGS. 12 and 13 show all four implemented in the improved lower latency forward 1200 and inverse quantisers 1300.

FIG. 12 shows a forward quantiser according to an embodiment of the present invention. The forward quantiser now comprises fewer overall components, but an increase in input values derived from a Look-up table.

In particular, positive and negative pre-shifted forward quantiser multiplication factors are provided to a multiplication sub-unit 1230 via a two-way multiplexer 1210, whose output is selected by the most significant bit (i.e. sign, in two's compliment) of the input coefficient $W_{ij}$. The other input to the multiplication sub-unit 1230 is the input coefficient itself, and the output of the multiplication sub-unit 1230 is one input into an addition sub-unit 1240. The other input to the addition sub-unit 1240 is the output of a conditional divider unit 1250, which divides a predetermined input value from the look-up table by two if the input picture is an inter picture, or leaves the predetermined input value unaltered if the input picture is an intra picture.

The output of the addition sub-unit 1240 is then right-shifted (>>) by 18 in a fixed right-shift operation 1260 to produce the absolute value of the forward quantised coefficients (|Z|). Since this right-shifting operation is of fixed size, it can be achieved in the same clock cycle (i.e. it is zero latency).

The predetermined input value is a constant and is $2^{18}/3$.

Meanwhile, a sign calculation unit, 1220 determines the sign (positive or negative nature) of the input coefficient $W_{ij}$, and provides this value to control the multiplexer 1210, and also outputs this value to the inverse quantiser, for use in inverse quantising the output of the forward quantiser 1200.

FIG. 13 shows an inverse quantiser 1300 according to an embodiment of the present invention. The inverse quantiser 1300 now also comprises fewer overall components, but again uses an increase in input values derived from a Look-up table.

In particular, the inverse quantiser 1300 now simply comprises a multiplication sub-unit 1320 to multiply |Z| (one of the outputs of the forward quantiser unit 1200), by +/−V, pre-shifted by QP/6, as described in more detail below. The selection is again carried out by a two-way multiplexer 1310, based upon the most significant bit (in two's compliment) of the original input coefficient to the forward quantiser unit 1200, $W_{ij}$.

The output of the inverse quantiser unit 1300 is a reconstituted output coefficient '$W_{ij}$.

Figure 14:
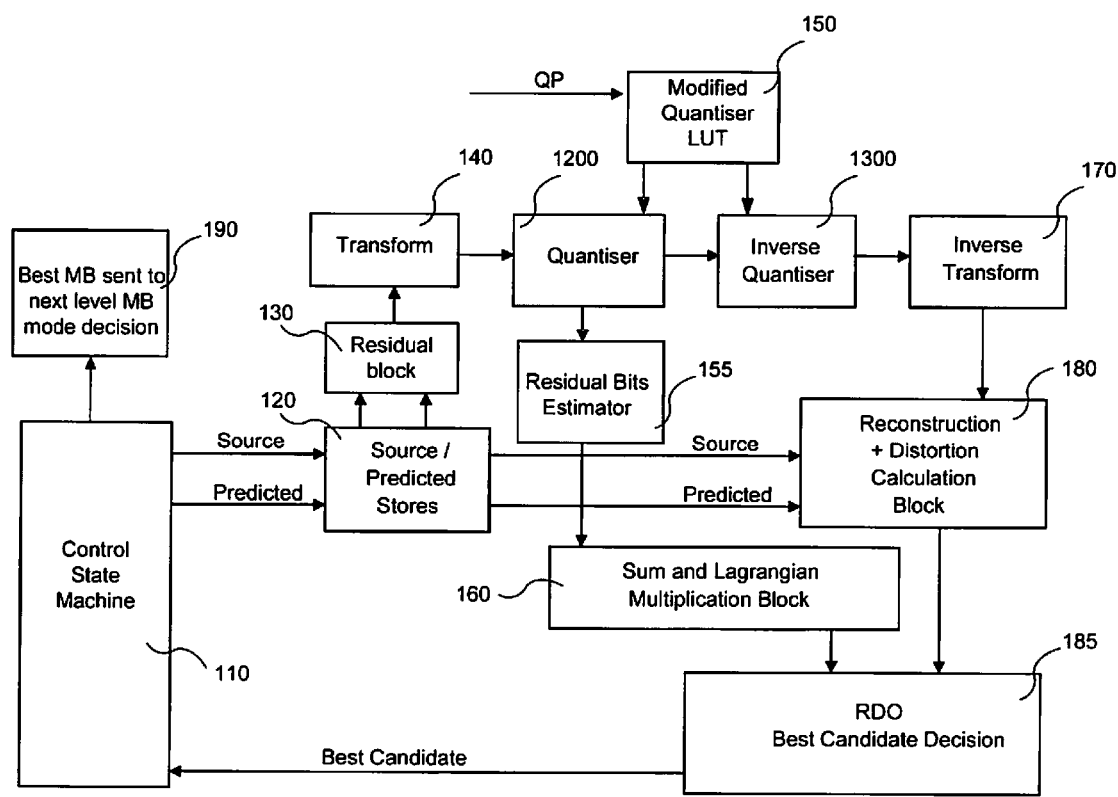
FIG. 14 shows an RDO apparatus according to an embodiment of the present invention.

FIG. 14 shows how a whole RDO engine (a.k.a. Transform Quantise (TQ) loop) operates when an embodiment of the present invention is implemented.

The control state machine 110 provides the source and matching predicted data in 4×4 pixel blocks. This data is stored in the source/predicted stores unit 120 and passed on to the residual calculation block 130. The determined residual (i.e. difference between the source and predicted pixels) is processed by the transform unit 140 to produce the transform coefficients $W_{ij}$ of the 4×4 pixel block being processed, it is these transform coefficients that are quantised by the forward quantiser 1200 adapted according to the present invention. The output of the forward quantiser 1200 is then fed to a residual bits estimator 155, which calculates the approximate number of bits required to encode the data, and separately to the inverse quantiser 1300 adapted according to the present invention.

The inverse quantiser 1300 is immediately followed by the inverse transform unit 170, which carries out the inverse transform function. Within the reconstruction and distortion calculation block 180, the output of the inverse transform unit 170 is added to the predicted data retrieved from the predicted store 120 to produce the reconstructed (recon) data.

The difference between this recon data and the source is the distortion introduced by the quantisation process, which is fed to the RDO best candidate decision block 185. The sum and langrangian multiplication block 160 takes the residual bits estimate, adds an overhead bits estimate (for the mb_type and other macroblock level coding syntax elements) before multiplying the result by lambda and passing the result to the RDO best candidate decision block 185. The RDO best candidate decision block 185 then has both the terms of the RDO equation and can calculate an RDO score for the mode/candidate being processed.

Figure 16:
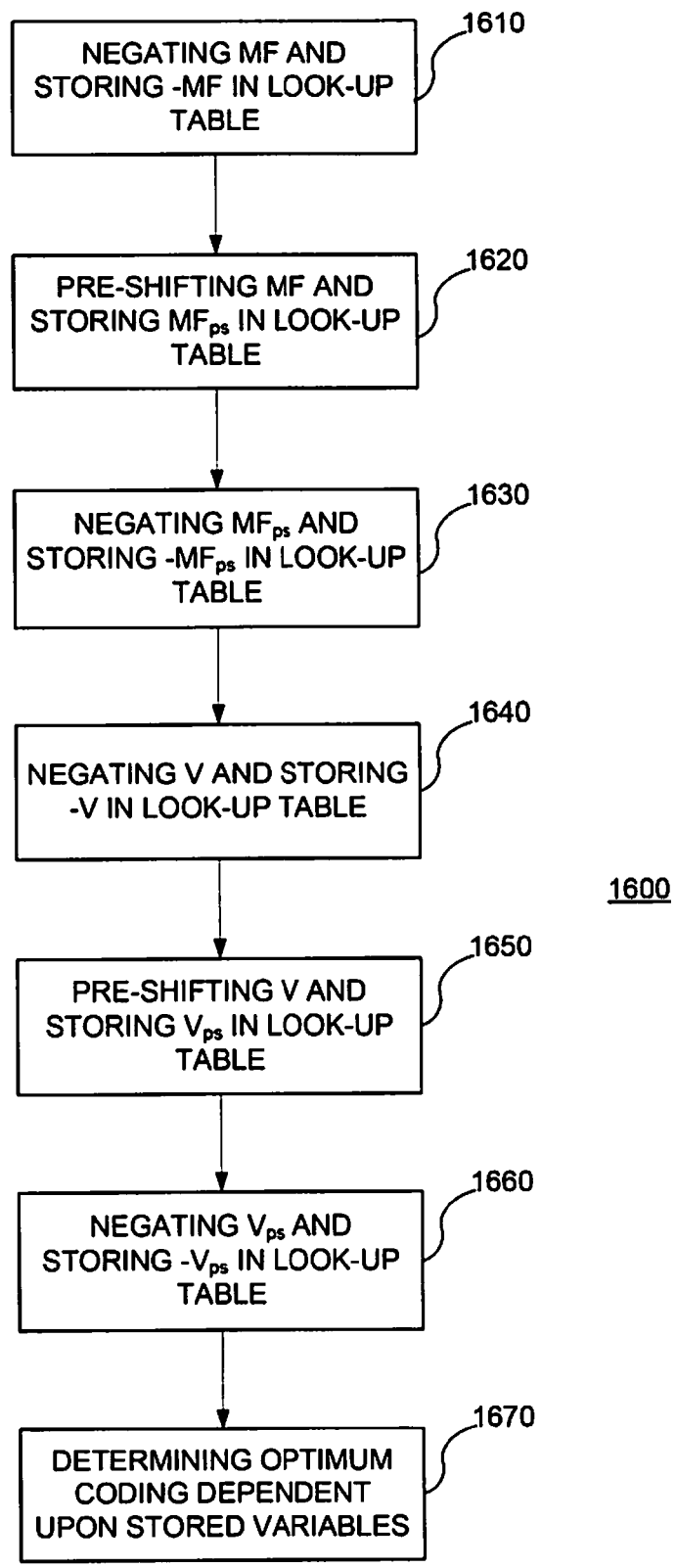
FIG. 16 shows a method of improving latency in an RDO apparatus according to an embodiment of the present invention.

FIG. 16 shows a high level flow diagram of the proposed method for improving latency in a rate distortion optimisation apparatus. The process comprises a number of negating (i.e. producing negative values corresponding to a given positive input value) and pre-shifting steps carried out on the forward and negative multiplication factors MF and V, each including a storage sub-step.

As can be seen from the four steps described above, and the more detailed description below, the improvements in latency of the forward and inverse quantisers provided by this solution are the result of carrying out certain calculations (pre-shifting and/or negating) on the multiplication factors in advance, and storing the results in a look-up table for use later on.

The exact order in which the negating and pre-shifting steps is carried out is not critical (other than the negating of pre-shifted values must occur after the respective pre-shifting step has been carried out, but it does not have to be immediately after the pre-shifting), and the content and order can depend on the particular implementation. This is because the two actions, pre-shifting and negating, independently provide an improvement in the latency of the overall RDO apparatus, but carrying out both provides an improvement that is the sum of the improvements provided by each individually. Hence, for a maximum reduction in latency, all the improvements are used, i.e. negating and pre-shifting of the forward and inverse quantisation factors (MF and V), and so the simply negated forward and inverse multiplication factors are not required, as the negated pre-shifted multiplication factors ($-MF_{ps}$ and $-V_{ps}$) already incorporate the improvement brought by negating. For example, in the full (i.e. maximised reduction in latency) implementation of FIG. 12, the negated forward multiplication factor (−MF) and negated inverse multiplication factors (−V) are not used, since the negated pre-shifted versions (−$MF_{ps}$ and −$V_{ps}$) will suffice. Lesser implementations may use the negating portions only, or the pre-shifting portions only The exemplary order shown in FIG. 16 comprises a first step of negating the forward quantiser multiplication factor (MF) at step 1610 to produce a negative forward quantiser multiplication factor (−MF), a second step of pre-shifting the forward quantiser multiplication factor (MF) 1620 to produce a pre-shifted forward quantiser multiplication factor ($MF_{ps}$), a third step of negating the pre-shifted forward quantiser multiplication factor ($MF_{ps}$) 1630 to produce a negative pre-shifted forward quantiser multiplication factor (−$MF_{ps}$), a fourth step of negating the inverse quantiser multiplication factor (V) 1640 to produce a negative inverse quantiser multiplication factor (−V), a fifth step of pre-shifting the inverse quantiser multiplication factor (MF) 1650 to produce a pre-shifted inverse quantiser multiplication factor ($V_{ps}$), a sixth step of negating the pre-shifted inverse quantiser multiplication factor ($V_{ps}$) 1660 to produce a negative pre-shifted inverse quantiser multiplication factor (−$V_{ps}$), and then determining an optimum coding dependent on the stored negated (i.e. negative) and/or pre-shifted forward and inverse quantisation multiplication factors.

Each negating or pre-shifting step includes the storage of the resultant negated and/or pre-shifted multiplication factor into a look-up table of values used by the forward and inverse quantisers.

Figure 17:
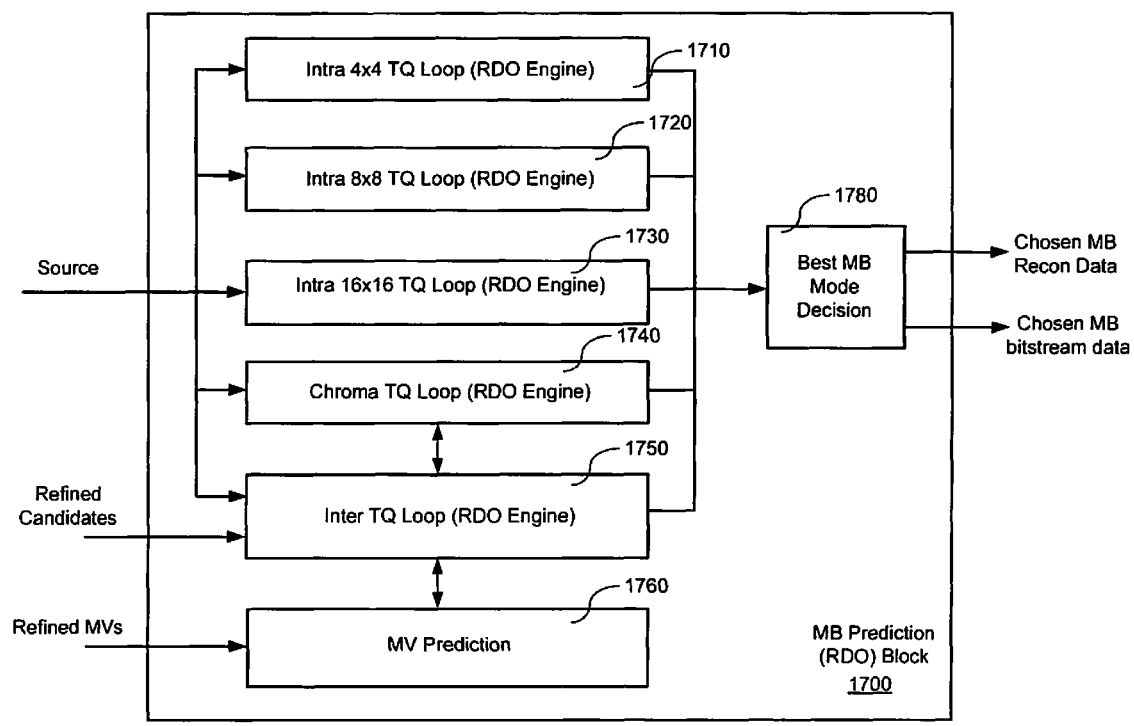
FIG. 17 shows a schematic diagram of a macroblock prediction block according to an embodiment of the present invention.

FIG. 17 shows how five RDO engines (1710-1750) are used at the macroblock prediction level. The intra 4×4 TQ loop 1710 finds the best possible intra 4×4 predicted macroblock. The intra 8×8 TQ loop 1720 finds the best possible intra 8×8 predicted macroblock. The intra 16×16 TQ loop 1730 finds the best possible intra 16×16 predicted macroblock. The chroma TQ loop 1740 finds the best possible intra chroma prediction mode and also provides an inter chroma RDO score to the inter TQ loop. The inter TQ loop 1750 finds the best possible inter macroblock type from the inter predicted candidates provided by the refinement search.

The Motion Vector (MV) prediction block 1760 calculates the direct mode MV and provides MV prediction data to the inter TQ loop 1750. The best macroblock mode decision block 1780 takes the best RDO scores from the four luma TQ loops, adds the appropriate chroma RDO score and then decides on the best macroblock to encode. The reconstructed data for the chosen macroblock is passed on the deblocking filter and the data to be encoded into the bitstream is passed on to the entropy coder.

Figure 18:
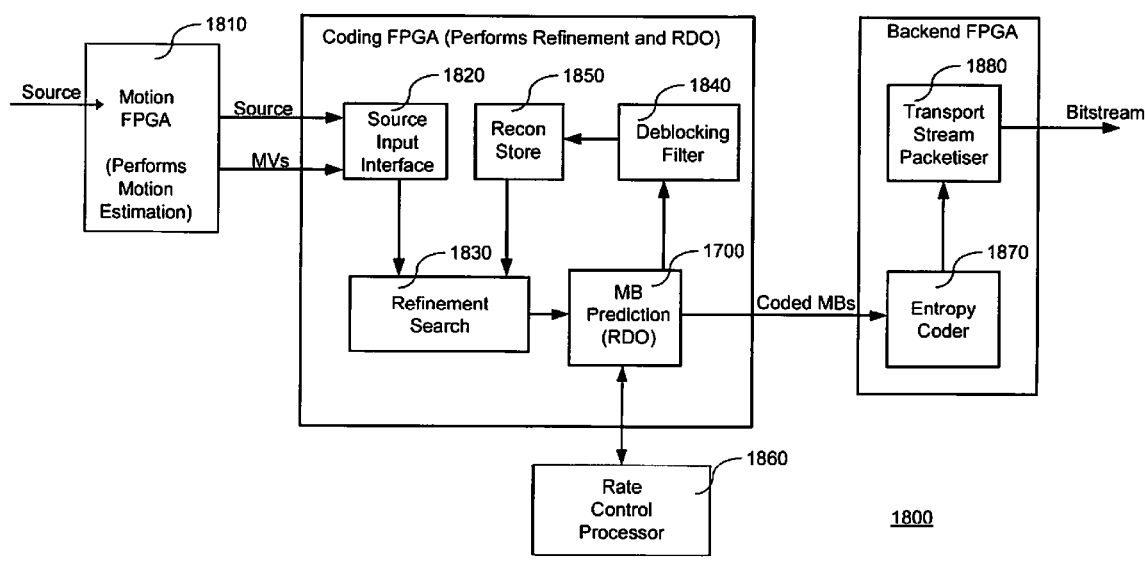
FIG. 18 shows overview schematic diagram of a video encoder according to an embodiment of the present invention.

FIG. 18 shows the macroblock prediction block 1700 in the context of the whole encoder. The motion Field Programmable Gate Array 1810, or equivalent ASIC or the like, performs motion estimation which provides the inter candidates, which once refined by the refinement search 1830 are passed to the macroblock prediction (RDO) block 1700. The deblocking filter 1840 smooths the chosen macroblock reconstructed data before the recon store 1850 saves it as possible reference for future inter candidates. The entropy coder 1870 processes the chosen macroblock bitstream data to produce the bitstream Network Adaptation Layer (NAL) units, which are packetised into the transport stream by the TS packetiser 1880.

The forward and inverse quantiser functions in more detail:

Step 1: Selecting Pre-Calculated Positive and Negative Forward Quantiser Multiplication Factors (MF) to Avoid Absolute Value Calculation The H.264 forward quantiser method requires multiplication of the absolute value of each input coefficient by a multiplication factor (MF). Conventionally the absolute value calculation and multiplication would be separate steps. The absolute value calculation would have a 1 cycle latency and the multiplication would have a 2 cycle latency.

The proposed solution achieves both the absolute value calculation and the multiplication in a single step. It does this by fetching pre-calculated MFs from a look-up table (LUT). Thus, the proposed solution uses the fact that these MFs can be selected to be negative for no extra latency, by storing negative versions of the MFs as well as the positive versions. Negative values are selected if the input coefficient is negative, so that a signed multiplier can be used to always give an unsigned result. This saves 1 clock cycle from the forward quantiser.

The H.264 forward quantiser method is conventionally expressed as:

$$|Z_{ij}|=(|W_{ij}|\cdot MF+f)>>q\text{bits}$$

$$\text{sign}(Z_{ij})=\text{sign}(W_{ij})$$

This can be expressed using a new variable sMF as:

$$sMF=MF \text{ when sign}(W_{ij})=+ve$$

$$sMF=-MF \text{ when sign}(W_{ij})=-ve$$

$$|Z_{ij}|=(W_{ij}\cdot sMF+f)>>q\text{bits}$$

$$\text{sign}(Z_{ij})=\text{sign}(W_{ij})$$

The above described arithmetic reduction avoids the step of finding the absolute value. The LUT which provides the forward quantiser multiplication factor (MF) can also provide a negated forward quantiser multiplication factor (−MF), such that the calculation of sMF is just a 2-way multiplex operation. As $W_{ij}$ is a two's complement value, the multiplexer control is simply the most significant bit of $W_{ij}$.

Step 2: Pre-Shifting the Forward Quantiser Multiplication Factor (MF)

The penultimate step of the H.264 forward quantiser method requires that the output coefficient is shifted by qbits. Conventionally, this variable shift would have a 1 cycle latency.

However, the proposed solution achieves this shift by pre-shifting the forward quantiser multiplication factor (MF) instead. As the forward quantiser multiplication factor is fetched from a LUT, the LUT can be modified to provide pre-shifted forward quantiser multiplication factors ($MF_{ps}$), and negative pre-shifted forward quantiser multiplication factors (−$MF_{ps}$). This saves another 1 clock cycle from the forward quantiser.

The H.264 forward quantiser method is conventionally expressed as:

$$|Z_{ij}|=(|W_{ij}|\cdot MF+f)>>q\text{bits}$$

where f is 2 qbits/3 for Intra blocks or 2 qbits/6 for Inter blocks, and $$q\text{bits}=15+\text{floor}(QP/6)$$

This can be expressed as:

$$|Z_{ij}|=(((|W_{ij}|\cdot(MF<<8)+128)>>\text{floor}(QP/6))+2^{23-inter/3})>>23$$

where inter=1 if macroblock is a inter macroblock, 0 otherwise, and the value 128 is a rounding factor.

The above equation would require a 23 bit multiplier to implement, compared to 18 for the conventional implementation. However, through experimentation, it has been found that it is acceptable to use an approximation to this function as the forward quantiser does not need to match the decoder. Thus, these functions may use an 18-bit multiplier and have been shown to have no significant encoder performance degradation:
In particular, the equation changes to as follows:

When $0 \leq \text{floor}(QP/6) \leq 3$:

$$|Z_{ij}|=(((|W_{ij}| \cdot (MF<<3))>>\text{floor}(QP/6))+2^{18-\text{inter}/3})>>18$$

When $4 \leq \text{floor}(QP/6) \leq 8$:

$$|Z_{ij}|=(((|W_{ij}| \cdot (MF<<3)+2^{\text{floor}(QP/6)-1})>>\text{floor}(QP/6))+2^{18-\text{inter}/3})>>18$$

As QP can only range from 0 to 51 in H.264, floor(QP/6) may only be in the range 0 to 8. The floor function rounds down to the nearest integer.

As QP is constant during a macroblock (MB) period, it can be used to pre-fetch pre-shifted forward quantiser multiplication factor ($MF_{ps}$) values from the LUT:

When $0 \leq \text{floor}(QP/6) \leq 3$:

$$LUT=MF_{ps}=(MF<<3)>>\text{floor}(QP/6)$$

When $4 \leq \text{floor}(QP/6) \leq 8$:

$$LUT=MF_{ps}=((MF<<3)+2^{\text{floor}(QP/6)-1})>>\text{floor}(QP/6)$$

This leaves the forward quantiser with the function:

$$|Z_{ij}|=(|W_{ij}| \cdot LUD+2^{18-\text{inter}/3})>>18$$

Step 3: Selecting Pre-Calculated Positive and Negative Inverse Quantiser Multiplication Factors (V) to Avoid Two's Complement Calculation The final step of the H.264 forward quantiser method requires that the sign of each output coefficient is set to that of the input coefficient. Conventionally, this would require 1 clock cycle to perform the two's complement calculation. The forward quantiser output coefficients are sent to the inverse quantiser 1300 and the entropy coder 1870.

The first stage of the inverse quantiser method is a signed multiplication of the input coefficient by a multiplication factor (V).

The proposed solution utilizes the fact that the inverse quantiser multiplication factor (V) can be selected to be negative for no extra latency, as it is read from a LUT. The forward quantiser output coefficients are passed on as a separate sign and absolute value and the sign is used to select negative or positive Vs. This saves another 1 clock cycle from the inverse quantiser. The first stage of the entropy coding method requires that the sign and absolute value be found for each input coefficient, so passing these separately from the forward quantiser also saves resources in the entropy coder 1870.

The H.264 forward quantiser method is conventionally expressed as:

$$|Z_{ij}|=(|W_{ij}| \cdot MF+f)>>q\text{bits}$$

$$\text{sign}(Z_{ij})=\text{sign}(W_{ij})$$

The H.264 inverse quantiser method is conventionally expressed as:

$$'W_{ij}=Z_{ij} \cdot V_{ij} \cdot 2^{\text{floor}(QP/6)}$$

Where $'W_{ij}$ is the inverse quantiser output coefficient, i.e. a reconstituted version of the input coefficient to the forward quantiser unit 1200 ($W_{ij}$).

This can be expressed as:

$$Z_{ij}=(|W_{ij}| \cdot MF+f)>>q\text{bits}$$

$$sV_{ij}=V_{ij} \text{ when sign}(W_{ij})=+ve$$

$$sV_{ij}=-V_{ij} \text{ when sign}(W_{ij})=-ve$$

$$'W_{ij}=Z_{ij} \cdot sV_{ij} \cdot 2^{\text{floor}(QP/6)}$$

The above substitution avoids the step of finding the two's complement value for the forward quantiser output if it is negative by performing the sign change using a negative multiplication factor. The LUT which provides can also provide $-V_{ij}$, such that the calculation of $sV_{ij}$ is just a 2-way multiplex operation.

Step 4: Pre-Shifting Inverse Quantiser Multiplication Factor (V)

The final step of the H.264 inverse quantiser method requires that the output coefficient is shifted by floor(QP/6) bits. Conventionally, this variable shift would have a 1 cycle latency.

The proposed solution achieves this shift by pre-shifting the inverse quantiser multiplication factor (V) instead. As V is fetched from a LUT, the LUT is modified to provide pre-shifted inverse quantiser multiplication factors ($V_{ps}$), and negative pre-shifted inverse multiplication factors ($-V_{ps}$). This saves 1 clock cycle from the inverse quantiser.

The H.264 inverse quantiser method is conventionally expressed as:

$$'W_{ij}=Z_{ij} \cdot V_{ij} \cdot 2^{\text{floor}(QP/6)}$$

As QP is constant during a macroblock period, it can be used to pre-fetch shifted $+/-V_{ps}$ values from the LUT:

$$LUT=V_{ij} \cdot 2^{\text{floor}(QP/6)}$$

This leaves the inverse quantiser with the function:

$$'W_{ij}=Z_{ij} \cdot LUT$$

Where LUT is the output value from the look-up table, being either $V_{ps}$ or $-V_{ps}$.

In the binary (i.e. digital) domain, the function $V_{ij} \cdot 2^{\text{floor}(QP/6)}$ is the same as a left shift of floor(QP/6), i.e:

$$LUT=V<<\text{floor}(QP/6)$$

The proposed hardware solution may be implemented only in part, with only one or more of the improvements implemented, each contributing their respective saving in cycles spent process a candidate. However, preferably, the solution implements all of the improvements to provide the full four cycle per RDO calculation reduction in the number of processing cycles required. It is this full implementation that is shown here in FIGS. 12 and 13, and the accompanying description, thus only $+/-MF_{ps}$ and $+/-V_{ps}$ are used.

The following examples show how the full implementation improves the latency of the RDO pipeline.

Intra 4×4 Mode RDO Example

The described four cycle reduction in the latency of the pipeline reduces the overall cycles taken to process all intra 4×4 modes by four cycles per 4×4 block. For the new pipeline latency of 22 clock cycles, as shown in FIG. 11, the overall time for processing all intra 4×4 options using two RDO engine pipelines will be (22+9)*10=310 cycles. This allows all of the intra 4×4 prediction modes to be processed within the 1080p60 macroblock period, hence improving encoder performance compared to the previous solution of reducing the number of modes assessed.

Intra 8×8 Mode RDO Example

The described four cycle reduction in the latency of the pipeline reduces the overall time taken to process all intra 8×8 modes by four clock cycles per 8×8 block. For the new pipeline latency of 42 clock cycles, as shown in FIG. 15, the overall time for processing all intra 4×4 options using two RDO engine pipelines will be (42+(9*4))*4=312 cycles. This allows all of the intra 4×4 prediction modes to be processed within the 1080p60 MB period, again showing an improved encoder performance compared to the previous solution of reducing the number of modes assessed.

Embodiments of the invention provide a pipelined RDO design, such as that shown in FIG. 14 to process RDO options more efficiently and in less overall clock cycles. Thus, the efficiency improvement allows more options (inter candidates or intra modes) to be processed by the hardware resources taken up by an RDO engine. Generally RDO comparison of more options will give higher video encoding performance.

There may be a particularly significant improvement for processing intra 4×4 modes and intra 8×8 modes, allowing all modes to be evaluated within a 1080p60 macroblock period.

The above described method may be carried out by any suitably adapted or designed hardware. Portions of the method may also be embodied in a set of instructions, stored on a computer readable medium, which when loaded into a computer, Digital Signal Processor (DSP) or similar, causes the computer to carry out the hereinbefore described method.

Equally, the method may be embodied as a specially programmed, or hardware designed, integrated circuit which operates to carry out the described RDO method when loaded into said integrated circuit. The integrated circuit may be formed as part of a general purpose computing device, such as a PC, and the like, or it may be formed as part of a more specialised device, such as a hardware video encoder, or the like.

One exemplary hardware embodiment is that of a Field Programmable Gate Array (FPGA) programmed to provide the described apparatus and/or to carry out the described RDO method, the FPGA being located on a daughterboard of a rack mounted video encoder held in a video production suite, location video support van/uplink van or the like, for use in, for example, television broadcasting or video production.

Another exemplary hardware embodiment of the present invention is that of hardware video encoder device embodied as one or more Application Specific Integrated Circuits (ASICs).

It will be apparent to the skilled person that the exact order and content of the steps carried out in the method described herein may be altered according to the requirements of a particular set of execution parameters, such as speed, quality or output bit rate of the video, and the like. Furthermore, it will be apparent that different embodiments of the disclosed apparatus may selectively implement certain features of the present invention in different combinations, according to the requirements of a particular implementation of the invention as a whole. Accordingly, the claim numbering is not to be construed as a strict limitation on the ability to move features between claims, and as such portions of dependent claims maybe utilised freely.

The invention claimed is:

1. An improved latency rate distortion optimisation apparatus comprising:
a forward quantiser unit for processing input coefficients ($W_{ij}$);
an inverse quantiser unit coupled to the forward quantiser unit; and
at least one look-up-table of quantiser values for use by the forward and inverse quantiser units;
wherein the at least one look-up-table of quantiser values further includes any one or more of the following modified quantiser multiplication factors:
negative forward quantiser multiplication factors (−MF);
pre-shifted forward quantiser multiplication factors ($MF_{ps}$);
negative pre-shifted forward quantiser multiplication factors (−$MF_{ps}$);
negative inverse quantiser multiplication factors (−V);
pre-shifted inverse quantiser multiplication factors ($V_{ps}$), wherein the pre-shifted quantiser multiplication factors are pre-shifted dependent upon a value derived from a Quantization parameter (QP) value of a macroblock under test; or
negative pre-shifted inverse quantiser multiplication factors (−$V_{ps}$); and
the forward quantiser unit is arranged to operate on the input coefficients ($W_{ij}$) using one of the modified forward quantiser multiplication factors; and
the inverse quantiser unit is arranged to operate on the output of the forward quantiser unit using one of the modified inverse quantiser multiplication factors.

2. The rate distortion optimisation apparatus of claim 1, wherein the negative forward quantiser multiplication factor (−MF) or negative pre-shifted forward quantiser multiplication factor (−$MF_{ps}$) is selected for use by the forward quantiser unit in replacement of the normal positive forward quantiser multiplication factors if a respective forward quantiser input coefficient is negative; and
wherein the negative inverse quantiser multiplication factor (−V) or the negative pre-shifted inverse quantiser multiplication factor (−$V_{ps}$) is selected for use by the inverse quantiser unit if the respective forward quantiser input coefficient is negative.

3. The rate distortion optimisation apparatus of claim 2, further comprising a two-way multiplexer unit for each of the forward and inverse quantiser units, each multiplexer unit adapted to select positive or negative quantiser multiplication factors for the forward and inverse quantiser units respectively, dependent upon a most significant bit of an input quantiser coefficient of the forward quantiser unit.

4. The rate distortion optimisation apparatus of claim 1, wherein the pre-shifted forward quantiser multiplication factors are restricted to 18 bits, and the pre-shifts applied comprise:

when $0 \leq \text{floor}(QP/6) \leq 3$:

$$MF_{ps} = (MF << 3) >> \text{floor}(QP/6); \text{ and}$$

when $4 \leq \text{floor}(QP/6) \leq 8$:

$$MF_{ps} = ((MF << 3) + 2^{\text{floor}(QP/6)-1}) >> \text{floor}(QP/6);$$

such that the forward quantiser unit has the function:

$$|Z_{ij}| = (|W_{ij}| \cdot MF_{ps}) + 2^{18-\text{inter}/3} >> 18;$$

wherein $Z_{ij}$ is an output coefficient of the forward quantiser unit, $W_{ij}$ is an input coefficient of the forward quantiser unit, and inter is 1 if the macroblock under test is from an inter picture and 0 otherwise.

5. The rate distortion optimisation apparatus of claim 1, wherein the pre-shifted inverse quantiser multiplication factors have the following pre-shift applied:

$$V_{ps}=(V>>\text{floor}(QP/6)).$$

6. The rate distortion optimisation apparatus of claim 1, wherein the forward quantiser unit further comprises:
   a multiplication unit, having a first input provided by an output of a forward quantiser two-way multiplexer unit and the input coefficient $W_{ij}$ of interest as a second input; and
   a sign function unit;
   wherein an output of the sign function unit selects the output of the forward quantiser two-way multiplexer unit to multiply with the input coefficient $W_{ij}$ of interest.

7. The rate distortion optimisation apparatus of claim 6, further comprising:
   an addition unit adapted to add a predetermined value to the output of the multiplication unit; and
   a conditional divider unit, wherein the conditional divider unit is operable on the predetermined value if an input picture is an inter picture, and otherwise passes through the predetermined value to the addition unit.

8. The rate distortion optimisation apparatus of claim 1, wherein the inverse quantiser unit further comprises:
   a multiplication unit, having a first input provided by an output of an inverse quantiser two-way multiplexer unit and an absolute quantised output (|Z|) of the forward quantiser unit as a second input;
   wherein an output of the sign function unit selects the output of the inverse quantiser two-way multiplexer unit to multiply with the absolute quantised output (|Z|).

9. A video encoder comprising a rate distortion optimisation apparatus comprising:
   a forward quantiser unit for processing input coefficients ($W_{ij}$);
   an inverse quantiser unit coupled to the forward quantiser unit; and
   at least one look-up-table of quantiser values for use by the forward and inverse quantiser units;
   wherein the at least one look-up-table of quantiser values further includes any one or more of the following modified quantiser multiplication factors:
      negative forward quantiser multiplication factors (−MF);
      pre-shifted forward quantiser multiplication factors ($MF_{ps}$), wherein the pre-shifted quantiser multiplication factors are pre-shifted dependent upon a value derived from a Quantisation Parameter (QP) value of a macroblock under test;
      negative pre-shifted forward quantiser multiplication factors (−$MF_{ps}$);
      negative inverse quantiser multiplication factors (−V);
      pre-shifted inverse quantiser multiplication factors ($V_{ps}$); or
      negative pre-shifted inverse quantiser multiplication factors (−$V_{ps}$); and
   the forward quantiser unit is arranged to operate on the input coefficients ($W_{ij}$) using one of the modified forward quantiser multiplication factors; and
   the inverse quantiser unit is arranged to operate on the output of the forward quantiser unit using one of the modified inverse quantiser multiplication factors.

10. A method of improving latency in a Rate Distortion Optimisation apparatus having a forward quantiser unit and an inverse quantiser unit and at least one look up table, the method comprising one or more of steps:
   negating a forward quantiser multiplication factor (MF) and storing the negative MF in the at least one look up table, for selection according to a sign value of an input coefficient of the forward quantiser unit;
   pre-shifting a forward quantiser multiplication factor (MF) value to produce a pre-shifted forward quantiser multiplication factor ($MF_{ps}$) value and storing $MF_{ps}$ in the at least one look up table;
   negating the pre-shifted forward quantiser multiplication factor ($MF_{ps}$) and storing −$MF_{ps}$ in the at least one look-up table;
   negating an inverse quantiser multiplication factor (V) and storing the negative V in the at least one look up table, for selection according to a sign value of an input coefficient of the forward quantiser unit;
   pre-shifting an inverse quantiser multiplication factor (V) value to produce a pre-shifted inverse quantiser multiplication factor ($V_{ps}$) value and storing $V_{ps}$ in the at least one look up table, wherein the step of pre-shifting the inverse quantiser multiplication factors ($V_{ps}$) comprises the shift $V_{ps}=(V<<\text{floor }(QP/6))$;
   negating the pre-shifted inverse quantiser multiplication factor ($V_{ps}$) and storing −$V_{ps}$ in the at least one look-up table;
   wherein the method further comprises:
   loading any one or more of the negative and/or pre-shifted quantiser multiplication factors from the at least one look up table;
   operating on the input coefficients by a forward quantiser unit using a one of the forward multiplication factors; and
   operating on the output of the forward quantiser unit by an inverse quantiser unit (1300) using one of the inverse multiplication factors.

11. The method of claim 10, wherein the pre-shifted forward quantiser multiplication factors are restricted to 18 bits, and the pre-shifting step comprises:

when $0 \leq \text{floor}(QP/6) \leq 3$:

$$MF_{ps}=(MF<<3)>>\text{floor}(QP/6); \text{ and}$$

when $4 \leq \text{floor}(QP/6) \leq 8$:

$$MF_{ps}=((MF<<3)+2^{\text{floor}(QP/6)-1})>>\text{floor}(QP/6);$$

such that the forward quantiser unit has the function:

$$|Z_{ij}|=(|W_{ij}| \cdot MF_{ps})+2^{18-inter/3}>>18;$$

wherein $Z_{ij}$ is an output coefficient of the forward quantiser unit, $W_{ij}$ is an input coefficient of the forward quantiser unit, and inter is 1 if the macroblock under test is from an inter picture and 0 otherwise.

12. The method of claim 10, wherein the latency is reduced by removing calculation steps from the real time calculation portion of the Rate Distortion Optimisation method through pre-calculating adapted forward and inverse quantiser multiplication factors.

* * * * *